(12) United States Patent
Roche et al.

(10) Patent No.: US 12,505,490 B2
(45) Date of Patent: Dec. 23, 2025

(54) CLAIM SUBMISSION AND MONITORING SYSTEM AND METHOD

(71) Applicant: WarrCloud, Inc., Meridian, ID (US)

(72) Inventors: James K. Roche, St. Louis, MO (US); David Wood, Vancouver (CA); Adam A. Mateljan, Shawnee, KS (US); Rajeswari N. Velichety, Monmouth Junction, NJ (US); Eli Sheynin "None", San Carlos, CA (US)

(73) Assignee: WARRCLOUD, INC., Meridian, ID (US)

( * ) Notice: Subject to any disclaimer, the term of this patent is extended or adjusted under 35 U.S.C. 154(b) by 0 days.

(21) Appl. No.: 18/970,526

(22) Filed: Dec. 5, 2024

(65) Prior Publication Data

US 2025/0182131 A1    Jun. 5, 2025

Related U.S. Application Data

(60) Provisional application No. 63/606,390, filed on Dec. 5, 2023.

(51) Int. Cl.
*G06Q 30/00* (2023.01)
*G06Q 10/20* (2023.01)
*G06Q 30/012* (2023.01)
*G06Q 40/08* (2012.01)

(52) U.S. Cl.
CPC ............ *G06Q 40/08* (2013.01); *G06Q 10/20* (2013.01); *G06Q 30/012* (2013.01)

(58) Field of Classification Search
None
See application file for complete search history.

(56) References Cited

U.S. PATENT DOCUMENTS

| | | |
|---|---|---|
| 11,120,497 B1 | 9/2021 | Schumann et al. |
| 11,263,700 B1 | 3/2022 | Hanson et al. |
| 12,131,387 B1 | 10/2024 | Leners et al. |
| 2002/0091549 A1 | 7/2002 | Provost et al. |
| 2002/0128876 A1 | 9/2002 | Mahoney et al. |
| 2006/0184434 A1 | 8/2006 | Schickler |
| 2007/0022410 A1 | 1/2007 | Ban et al. |

(Continued)

FOREIGN PATENT DOCUMENTS

CA    3052163 A1    2/2020

OTHER PUBLICATIONS

ServiceNow chatbot builder helps automate common service requests, TechCrunch New York: AOL Inc. (May 9, 2018) (Year: 2018).*

(Continued)

*Primary Examiner* — Matthew T Sittner
(74) *Attorney, Agent, or Firm* — Brian J. Colandreo; Heath M. Sargeant; Holland & Knight LLP

(57) ABSTRACT

A method, computer program product, and computing system for: receiving an initial claim for a vehicle from a submitter, wherein the initial claim is destined for a claim service processor; processing the initial claim to determine if the initial claim can be processed by an existing bot included within a claim processing bot repository; if the initial claim cannot be processed by any of the existing bots included within the claim processing bot repository, generating a bespoke bot for processing the initial claim.

21 Claims, 8 Drawing Sheets

(56) References Cited

U.S. PATENT DOCUMENTS

| | | | |
|---|---|---|---|
| 2007/0038506 A1 | 2/2007 | Noble et al. | |
| 2007/0061774 A1 | 3/2007 | Chan et al. | |
| 2007/0136106 A1 | 6/2007 | Hart et al. | |
| 2007/0260646 A1* | 11/2007 | Szlam | G06Q 40/08 |
| | | | 707/999.203 |
| 2008/0215400 A1 | 9/2008 | Ban et al. | |
| 2012/0143630 A1 | 6/2012 | Hertenstein | |
| 2012/0143634 A1* | 6/2012 | Beyda | G06Q 40/08 |
| | | | 705/4 |
| 2013/0297353 A1 | 11/2013 | Strange et al. | |
| 2014/0006309 A1 | 1/2014 | Reisman | |
| 2014/0297473 A1 | 10/2014 | Singh et al. | |
| 2015/0103170 A1* | 4/2015 | Nelson | G06Q 10/20 |
| | | | 348/148 |
| 2015/0154712 A1 | 6/2015 | Cook | |
| 2015/0221041 A1 | 8/2015 | Hanson et al. | |
| 2018/0186345 A1 | 7/2018 | Lo Presti | |
| 2018/0294059 A1 | 10/2018 | Savant et al. | |
| 2019/0166071 A1 | 5/2019 | Lim et al. | |
| 2019/0266254 A1 | 8/2019 | Blumenfeld et al. | |
| 2019/0267001 A1* | 8/2019 | Byun | G10L 15/18 |
| 2019/0304025 A1 | 10/2019 | Szott | |
| 2020/0058025 A1 | 2/2020 | Raw et al. | |
| 2020/0150839 A1 | 5/2020 | Roisman et al. | |
| 2020/0172112 A1* | 6/2020 | Kawashima | B60W 50/085 |
| 2020/0234515 A1 | 7/2020 | Gronsbell et al. | |
| 2020/0286099 A1 | 9/2020 | Tahir et al. | |
| 2020/0286616 A1 | 9/2020 | Dunn et al. | |
| 2020/0302263 A1* | 9/2020 | Douek | G06N 20/00 |
| 2020/0341970 A1 | 10/2020 | Rodrigues | |
| 2020/0387550 A1* | 12/2020 | Cappetta | G06F 16/9538 |
| 2020/0394364 A1* | 12/2020 | Venkateshwaran | G06F 40/117 |
| 2021/0043061 A1 | 2/2021 | Potter et al. | |
| 2021/0133680 A1* | 5/2021 | Kunnath | G06F 8/30 |
| 2021/0200762 A1 | 7/2021 | Trummer | |
| 2021/0224975 A1 | 7/2021 | Ranca et al. | |
| 2021/0312567 A1 | 10/2021 | Hayward et al. | |
| 2021/0350470 A1* | 11/2021 | Lambert | G06T 7/0004 |
| 2022/0114598 A1 | 4/2022 | Perkna et al. | |
| 2022/0165104 A1 | 5/2022 | Gardiner et al. | |
| 2022/0358599 A1 | 11/2022 | Sood et al. | |
| 2023/0005070 A1 | 1/2023 | Nguyen et al. | |
| 2023/0028408 A1 | 1/2023 | De et al. | |
| 2023/0078448 A1 | 3/2023 | Cella et al. | |
| 2023/0080589 A1 | 3/2023 | Gupta et al. | |
| 2023/0109905 A1* | 4/2023 | Chandrasekaran | G06N 5/022 |
| | | | 706/46 |
| 2023/0153650 A1 | 5/2023 | Mossoba et al. | |
| 2023/0214936 A1 | 7/2023 | Larson et al. | |
| 2023/0237348 A1 | 7/2023 | Polleri et al. | |
| 2023/0247019 A1 | 8/2023 | Kshirsagar et al. | |
| 2023/0259558 A1 | 8/2023 | Subramaniam et al. | |
| 2023/0274587 A1 | 8/2023 | Gronsbell et al. | |
| 2023/0306433 A1* | 9/2023 | Dadhich | G06N 10/20 |
| 2023/0316138 A1 | 10/2023 | Nguyen et al. | |
| 2024/0291777 A1 | 8/2024 | Fields et al. | |
| 2024/0311921 A1* | 9/2024 | Fields | G06F 8/65 |
| 2024/0386313 A1 | 11/2024 | Pedersen et al. | |

OTHER PUBLICATIONS

The Payoff of Expert Systems, Loofbourrow, Tod Hayes. Best's Review, Property/casualty insurance edition 92.1: 56. Oldwick: A.M. Best Company. (May 1991) (Year: 1991).*

International Search Report and Written Opinion issued in related Application Serial No. PCT/US2024/058746 on Jan. 16, 2025.

International Search Report and Written Opinion issued in related Application Serial No. PCT/US2024/058701 on Feb. 7, 2025.

International Search Report and Written Opinion issued in related Application Serial No. PCT/US2024/058713 on Jan. 27, 2025.

International Search Report and Written Opinion issued in related Application Serial No. PCT/US2024/058719 on Feb. 13, 2025.

International Search Report and Written Opinion issued in related Application Serial No. PCT/US2024/058737 on Feb. 13, 2025.

International Search Report and Written Opinion issued in related Application Serial No. PCT/US2024/058740 on Feb. 6, 2025.

Non-Final Office Action issued in related U.S. Appl. No. 18/970,474 on Jan. 31, 2025.

Non-Final Office Action issued in related U.S. Appl. No. 18/970,501 on Feb. 14, 2025.

Non-Final Office Action issued in related U.S. Appl. No. 18/970,576 on Feb. 13, 2025.

Warrcloud, "Warrcloud is a game changer", Warrcloud.com, [Retrieved from the internet URL: https://web.archive.org/web/20231129205403/https://warrcloud.com], Nov. 29, 2023.

Xu, Anbang, et al." A New Chatbot for Customer Service on Social Media." Proceedings of the 2017 CHI conference on human factors in computing systems. 2017. (Year: 2017).

Non-Final Office Action issued in related U.S. Appl. No. 18/970,436 on Feb. 21, 2025.

Non-Final Office Action issued in related U.S. Appl. No. 18/970,588 on Feb. 21, 2025.

T. A. Syed, M. S. Siddique, A. Nadeem, A. Alzahrani, S. Jan and M. A. K. Khattak, "A Novel Blockchain-Based Framework for Vehicle Life Cycle Tracking: An End-to-End Solution," in IEEE Access, vol. 8, pp. 111042-111063, 2020, doi: 10.1109/ACCESS 2020. 3002170. (Year: 2020).

Automated charge capture at the point of care increases revenue. (Group Practice Management). Author: Garrity, Charles E, Jr. Publication info: Healthcare Financial Management 55. 12: 66(5). Healthcare Financial Management Association. (Dec. 2001) (Year: 2001).

Electronic billing 'juiced' my bottom line. Author: Brown, Sanford. Publication info: Physician's Management 38.7: 65-68. UBM Americas. (Jul. 1998) (Year: 1998).

Final Office Action issued in related U.S. Appl. No. 18/970,474 on May 15, 2025.

Final Office Action issued in related U.S. Appl. No. 18/970,576 on Jun. 3, 2025.

Notice of Allowance issued in related U.S. Appl. No. 18/970,501 on Jun. 6, 2025.

Who will market insurance at the beginning of the twenty-first century? Author: Lilly, Claude C, III; Wood, David D. Publication info: Society of Chartered Property and Casualty Underwriters. CPCU Journal 50.4: 210-233. Society of Chartered Property and Casualty Underwriters. (Winter 1997) (Year: 1997).

Final Office Action issued in related U.S. Appl. No. 18/970,436 on Oct. 8, 2025.

Final Office Action issued in related U.S. Appl. No. 18/970,588 on Oct. 9, 2025.

Notice of Allowance issued in related U.S. Appl. No. 18/970,501 on Aug. 25, 2025.

Non-Final Office Action issued in related U.S. Appl. No. 18/970,576 on Oct. 28, 2025.

Oza, D., Padhiyar, D., Doshi, V., & Patil, S. (Apr. 2020). Insurance claim processing using RPA along with chatbot. In Proceedings of the 3rd International Conference on Advances in Science & Technology (ICAST). (Year: 2020).

Non-Final Office Action issued in related U.S. Appl. No. 18/970,474 on Nov. 6, 2025.

* cited by examiner

CLAIM SUBMISSION AND MONITORING SYSTEM AND METHOD

RELATED APPLICATION

This application claims the benefit of U.S. Provisional Application No. 63/606,390, filed on 5 Dec. 2023, the entire contents of which are herein incorporated by reference.

TECHNICAL FIELD

This disclosure relates to claim submissions and, more particularly, to systems and methods for monitoring the processing of such claim submissions.

BACKGROUND

Dealers typically submit warranty claims to automakers through a standardized process involving the manufacturer's warranty management system. When a customer brings in a vehicle for repair under warranty, the dealer diagnoses the issue, performs the necessary repairs, and records the details, including labor hours, parts used, and fault codes. These details are then submitted electronically to the automaker for approval and reimbursement, wherein the automakers have specific guidelines that dealers must follow, including proper documentation, adherence to time allowances, and compliance with repair protocols.

However, this process is not without challenges. This standardized process of claim submission is often anything but standardized. For example, these systems are often arcane and difficult to use/navigate, requiring specialized knowledge to be efficiently utilized for claim submission. Dealers often face delays in claim approvals due to stringent audits and discrepancies in documentation. Automakers may reject claims if they believe repairs were unnecessary, procedures were improperly followed, or costs exceeded predefined limits. Additionally, navigating complex warranty systems and meeting varying requirements for different vehicle models or regions can add to the workload. Such issues may strain the dealer-manufacturer relationship and lead to financial pressure on dealers, as reimbursement delays affect cash flow. These problems emphasize the need for clear communication, robust systems, and mutual understanding between dealers and manufacturers.

SUMMARY OF DISCLOSURE

Concept 4—New Claim/New Bot

In one implementation, a computer-implemented method, executed on a computing device, includes: receiving an initial claim for a vehicle from a submitter, wherein the initial claim is destined for a claim service processor; processing the initial claim to determine if the initial claim can be processed by an existing bot included within a claim processing bot repository; if the initial claim cannot be processed by any of the existing bots included within the claim processing bot repository, generating a bespoke bot for processing the initial claim.

One or more of the following features may be included. The initial claim may concern one or more of: a covered maintenance claim for the vehicle; an over-the-counter parts claim for the vehicle; a transportation damage claim for the vehicle; a pre-delivery inspection claim for the vehicle; a warranty claim for the vehicle; and a recall for the vehicle. The submitter may include one or more of: an authorized service center associated with the vehicle; a dealership associated with the vehicle; a repair shop servicing the vehicle; and a company associated with the vehicle. The vehicle may be one of: a private vehicle; a commercial vehicle; a watersport vehicle; a heavy equipment vehicle; an aircraft; and a fleet vehicle. The fleet vehicle may include one or more of: a corporate vehicle; a rideshare vehicle; and a rental vehicle. The claim service processor may be an original equipment manufacturer of the vehicle. The claim service processor may be a third-party warranty provider for the vehicle. The initial claim may be processed using the bespoke bot. The bespoke bot may be processed to identify one or more additional vehicles for which claims may be processed by the bespoke bot, thus defining a curated bot. The curated bot may be added to the claim processing bot repository. Generating a bespoke bot for processing the initial claim may include: processing the initial claim for the vehicle from the submitter using machine learning/artificial intelligence to generate the bespoke bot for processing the initial claim.

In another implementation, a computer program product resides on a computer readable medium and has a plurality of instructions stored on it. When executed by a processor, the instructions cause the processor to perform operations including: receiving an initial claim for a vehicle from a submitter, wherein the initial claim is destined for a claim service processor; processing the initial claim to determine if the initial claim can be processed by an existing bot included within a claim processing bot repository; if the initial claim cannot be processed by any of the existing bots included within the claim processing bot repository, generating a bespoke bot for processing the initial claim.

One or more of the following features may be included. The initial claim may concern one or more of: a covered maintenance claim for the vehicle; an over-the-counter parts claim for the vehicle; a transportation damage claim for the vehicle; a pre-delivery inspection claim for the vehicle; a warranty claim for the vehicle; and a recall for the vehicle. The submitter may include one or more of: an authorized service center associated with the vehicle; a dealership associated with the vehicle; a repair shop servicing the vehicle; and a company associated with the vehicle. The vehicle may be one of: a private vehicle; a commercial vehicle; a watersport vehicle; a heavy equipment vehicle; an aircraft; and a fleet vehicle. The fleet vehicle may include one or more of: a corporate vehicle; a rideshare vehicle; and a rental vehicle. The claim service processor may be an original equipment manufacturer of the vehicle. The claim service processor may be a third-party warranty provider for the vehicle. The initial claim may be processed using the bespoke bot. The bespoke bot may be processed to identify one or more additional vehicles for which claims may be processed by the bespoke bot, thus defining a curated bot. The curated bot may be added to the claim processing bot repository. Generating a bespoke bot for processing the initial claim may include: processing the initial claim for the vehicle from the submitter using machine learning/artificial intelligence to generate the bespoke bot for processing the initial claim.

In another implementation, a computing system including a processor and memory is configured to perform operations including: receiving an initial claim for a vehicle from a submitter, wherein the initial claim is destined for a claim service processor; processing the initial claim to determine if the initial claim can be processed by an existing bot included within a claim processing bot repository; if the initial claim cannot be processed by any of the existing bots included within the claim processing bot repository, generating a bespoke bot for processing the initial claim.

One or more of the following features may be included. The initial claim may concern one or more of: a covered maintenance claim for the vehicle; an over-the-counter parts claim for the vehicle; a transportation damage claim for the vehicle; a pre-delivery inspection claim for the vehicle; a warranty claim for the vehicle; and a recall for the vehicle. The submitter may include one or more of: an authorized service center associated with the vehicle; a dealership associated with the vehicle; a repair shop servicing the vehicle; and a company associated with the vehicle. The vehicle may be one of: a private vehicle; a commercial vehicle; a watersport vehicle; a heavy equipment vehicle; an aircraft; and a fleet vehicle. The fleet vehicle may include one or more of: a corporate vehicle; a rideshare vehicle; and a rental vehicle. The claim service processor may be an original equipment manufacturer of the vehicle. The claim service processor may be a third-party warranty provider for the vehicle. The initial claim may be processed using the bespoke bot. The bespoke bot may be processed to identify one or more additional vehicles for which claims may be processed by the bespoke bot, thus defining a curated bot. The curated bot may be added to the claim processing bot repository. Generating a bespoke bot for processing the initial claim may include: processing the initial claim for the vehicle from the submitter using machine learning/artificial intelligence to generate the bespoke bot for processing the initial claim.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
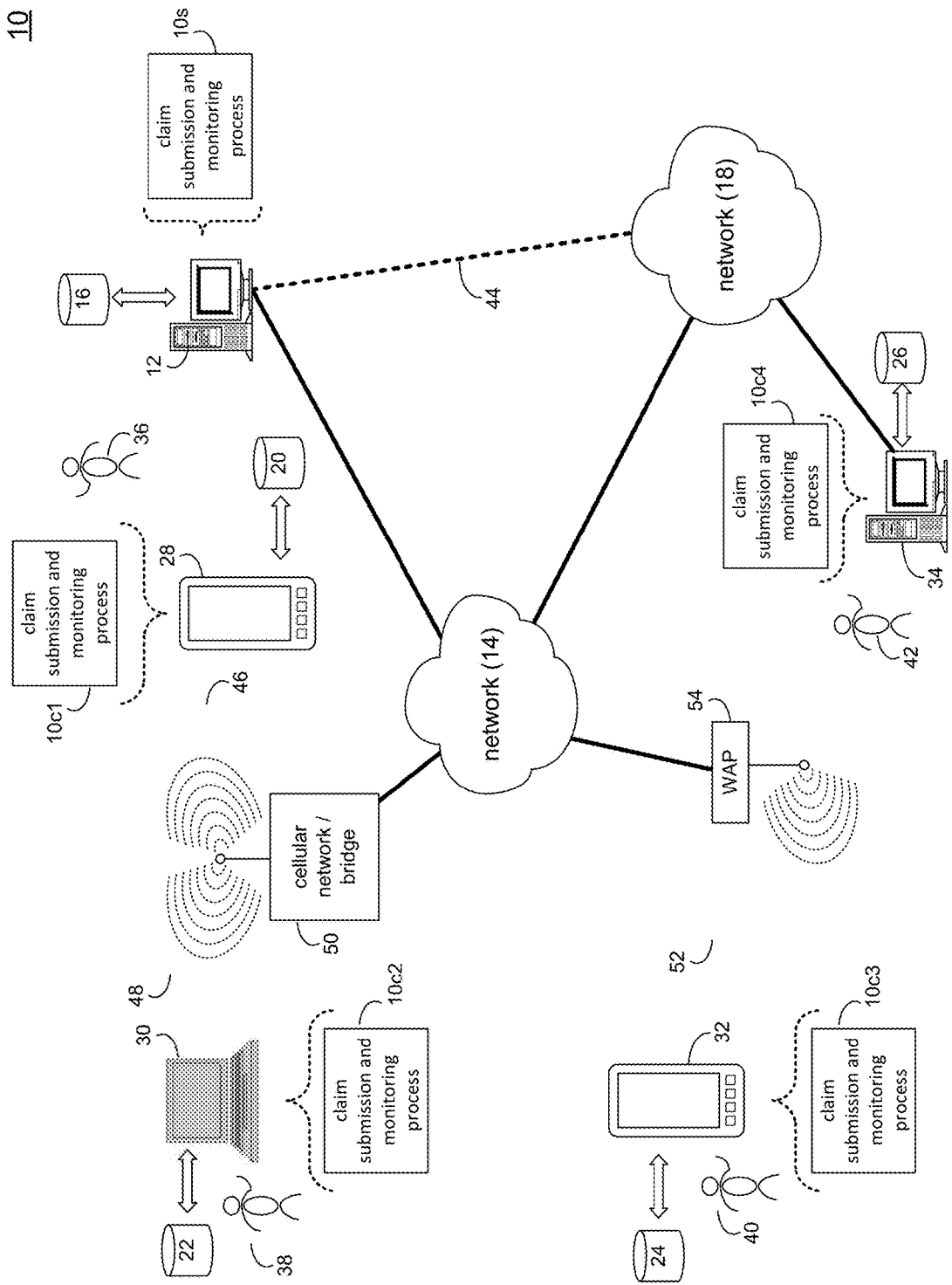
FIG. 1 is a diagrammatic view of a distributed computing network including a computing device that executes a claim submission and monitoring process according to an implementation of the present disclosure.

System Overview:

Referring to FIG. 1, there is shown claim submission and monitoring process 10. As will be discussed below in greater detail, claim submission and monitoring process 10 may streamline the process of claim submission and monitoring.

Claim submission and monitoring process 10 may be implemented as a server-side process, a client-side process, or a hybrid server-side/client-side process. For example, claim submission and monitoring process 10 may be implemented as a purely server-side process via claim submission and monitoring process 10$s$. Alternatively, claim submission and monitoring process 10 may be implemented as a purely client-side process via one or more of claim submission and monitoring process 10$c$1, claim submission and monitoring process 10$c$2, claim submission and monitoring process 10$c$3, and claim submission and monitoring process 10$c$4. Alternatively still, claim submission and monitoring process 10 may be implemented as a hybrid server-side/client-side process via claim submission and monitoring process 10$s$ in combination with one or more of claim submission and monitoring process 10$c$1, claim submission and monitoring process 10$c$2, claim submission and monitoring process 10$c$3, and claim submission and monitoring process 10$c$4. Accordingly, claim submission and monitoring process 10 as used in this disclosure may include any combination of claim submission and monitoring process 10$s$, claim submission and monitoring process 10$c$1, claim submission and monitoring process 10$c$2, claim submission and monitoring process 10$c$3, and claim submission and monitoring process 10$c$4.

Claim submission and monitoring process 10$s$ may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a cable/satellite receiver with one or more processors embedded therein or coupled thereto, a server computer, a series of server computers, a mini computer, a mainframe computer, or a dedicated network device.

The instruction sets and subroutines of claim submission and monitoring process 10$s$, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of claim submission and monitoring processes 10$c$1, 10$c$2, 10$c$3, 10$c$4 may include but are not limited to a web browser, a game console user interface, or a specialized application (e.g., an application running on e.g., the Android™ platform or the iPhone™ platform). The instruction sets and subroutines of roadside assistance applications 10$c$1, 10$c$2, 10$c$3, 10$c$4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), a smart television (not shown), and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Additionally/alternatively, virtual desktops and virtual machines may be utilized to access claim submission and monitoring process 10. As is known in the art, a virtual machine (VM) is a software-based emulation of a physical computer, allowing multiple operating systems to run simultaneously on a single physical machine. It functions as an isolated environment that mimics the hardware of a computer, enabling users to install and operate operating systems and applications as if they were on a dedicated physical device. Virtual machines are managed by a hypervisor, which allocates resources such as CPU, memory, and storage to each VM while ensuring they operate independently from one another. This technology is widely used for software testing, running legacy applications, server consolidation, and creating secure environments. By abstracting hardware, virtual machines provide flexibility, scalability, and cost efficiency in both development and production settings. As is known in the art, a virtual desktop is a computing environment that allows users to access a desktop operating system and applications hosted on a remote server rather than a local device. Delivered through technologies like Virtual Desktop Infrastructure (VDI) or cloud services, a virtual desktop provides a consistent, customizable workspace accessible from various devices, including laptops, tablets, and smartphones. This setup enables centralized management of desktops, ensuring that updates, security, and backups are handled on the server side, enhancing IT efficiency and reducing maintenance costs. Virtual desktops are widely used for remote work, as they allow employees to securely access their work environment from anywhere, while businesses benefit from enhanced data security, scalability, and reduced hardware dependency.

Users 36, 38, 40, 42 may access claim submission and monitoring process 10 directly through network 14 or through secondary network 18. Further, claim submission and monitoring process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 46, 48 (respectively) established between data-enabled, cellular telephone 28, laptop computer 30 (respectively) and cellular network/bridge 50, which is shown directly coupled to network 14. Further, personal digital assistant 32 is shown wirelessly coupled to network 14 via wireless communication channel 52 established between personal digital assistant 32 and wireless access point (i.e., WAP) 54, which is shown directly coupled to network 14. Additionally, personal computer 34 is shown directly coupled to network 18 via a hardwired network connection.

WAP 54 may be, for example, an IEEE 802.11a, 802.11b, 802.11g, 802.11n, Wi-Fi, and/or Bluetooth device that is capable of establishing wireless communication channel 52 between personal digital assistant 32 and WAP 54. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Figure 2:
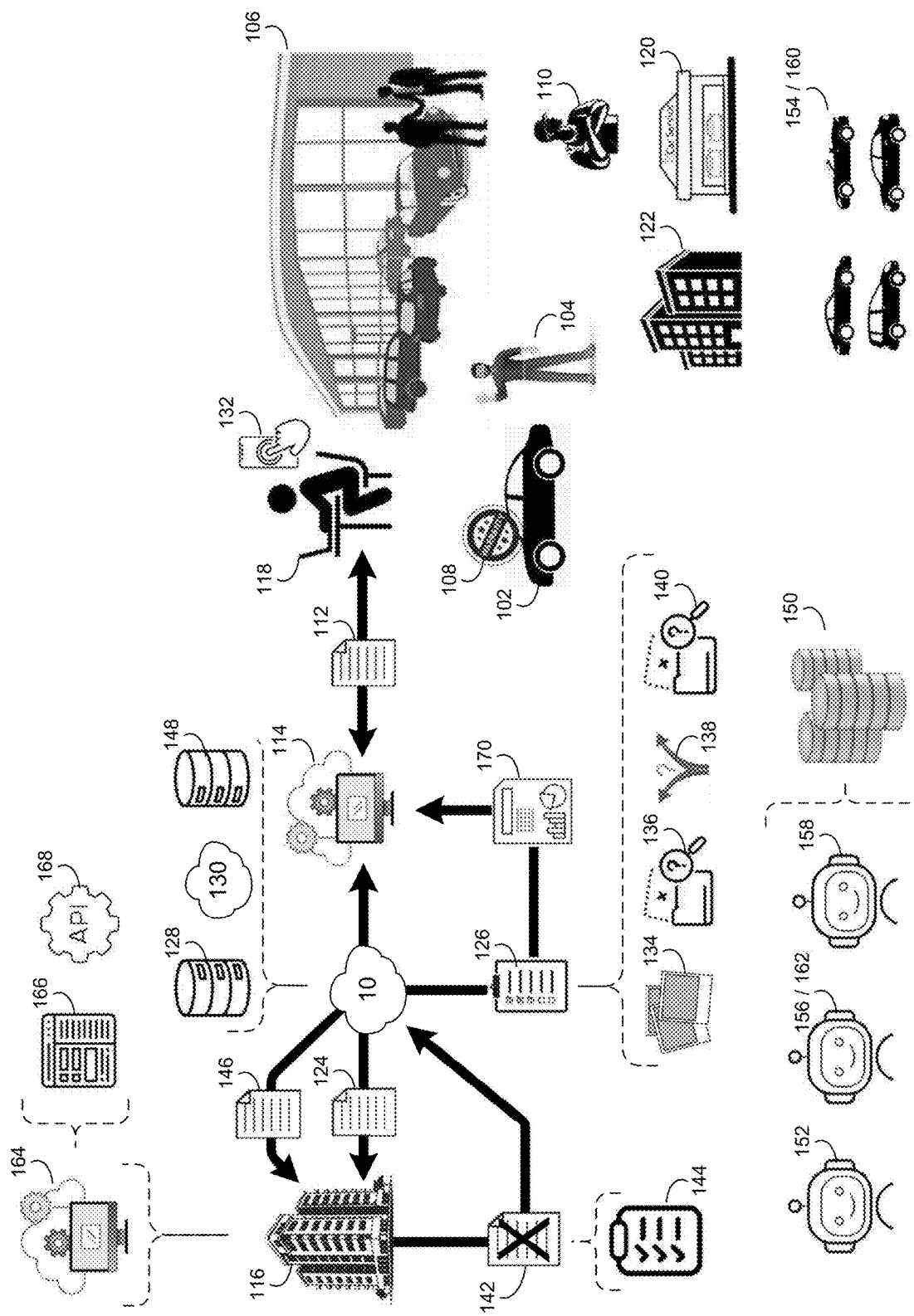
FIG. 2 is a diagrammatic view of a warranty instance monitored by the claim submission and monitoring process of FIG. 1.

Claim Submission and Monitoring Process (Overview):

As discussed above and referring also to FIG. 2, claim submission and monitoring process 10 may be utilized to streamline the process of claim submission and monitoring. For example, assume that a dealership is an automotive dealership that sells new and used vehicles (e.g., vehicle 102). Further, assume that a customer (e.g., customer 104) has purchased a new automobile (e.g., vehicle 102) from the dealership (e.g., dealership 106) and is having a problem with the transmission of the vehicle (e.g., vehicle 102).

Being the vehicle (e.g., vehicle 102) is covered by a manufactures warranty (e.g., warranty 108), the customer (e.g., customer 104) may visit the dealership (e.g., dealership 106) to have the vehicle (e.g., vehicle 102) examined. Accordingly, a technician (e.g., technician 110) within the dealership (e.g., dealership 106) may examine the vehicle (e.g., vehicle 102) and determine that the transmission of the vehicle (e.g., vehicle 102) is failing and that it needs to be replaced. Being the vehicle (e.g., vehicle 102) is still covered by the manufacturer's warranty (e.g., warranty 108), this repair should be covered by the same.

Accordingly, the dealership (e.g., dealership 106) (via a service advisor, a service manager and/or technician 110) may put together a claim (e.g., 112) for this warranty repair. This claim (e.g., 112) may define the parts needed for the repair, the labor required to effectuate the repair, and any other incidentals (e.g., a rental car). This claim (e.g., 112) may be prepared via the dealer management system (e.g., DMS 114) used by the dealership (e.g., dealership 106).

A Dealer Management System (e.g., DMS 114) is a comprehensive software platform that helps automotive dealerships streamline and manage their daily operations across sales, service, inventory, and financial functions. It serves as a centralized system that integrates various dealership activities, ensuring efficiency and better coordination among departments. For sales management, a DMS tracks customer interactions, vehicle sales, financing options, and trade-ins, guiding the entire sales process from inquiry to deal closure. In inventory management, it monitors the stock of new and used vehicles, parts, and accessories, helping dealerships maintain optimal inventory levels and track availability. It also supports service and repair operations by managing appointments, repair orders, labor tracking, and warranty claims, ensuring accurate billing and efficient scheduling.

Additionally, a DMS includes customer relationship management (CRM) features that store customer data, such as contact information, purchase history, and service records, enabling personalized follow-ups and improving customer retention. Financial management is another critical function, as the system handles billing, invoicing, payroll, and financial reporting, integrating transactions from sales and service for accurate accounting. A DMS also simplifies warranty and recall management by automating claim submissions and tracking their status, while its integration with OEMs ensures real-time updates on vehicle specifications, parts availability, and promotions.

The benefits of a DMS include increased operational efficiency through task automation, improved customer experience with faster and more personalized service, and valuable data insights to support decision-making. It ensures compliance with OEM and regulatory requirements and is scalable to support dealership growth. As a result, a DMS is essential for modern dealerships to operate effectively, enhance profitability, and maintain a competitive edge in the market.

Accordingly and through the use of such a dealer management system (e.g., DMS 114), the above-described claim (e.g., 112) may be prepared and submitted to the claim service processor (e.g., claim service processor 116) so that the dealership (e.g., dealership 106) may be reimbursed for the cost of effectuating warranty repairs on the transmission of the vehicle. Unfortunately and quite often, these initial claims (e.g., claim 112) may have defects in them that result in these initial claims (e.g., 112) being rejected, which in turn slows down payment of the warranty claim (e.g., 112) and may create cash flow issues for the dealership (e.g., dealership 106). Accordingly, and through the use of claim submission process 10, the process of submitting and monitoring such claims (e.g., 112) may be enhanced and streamline.

Concept 1—WarrCloud

As will be discussed below in greater detail, claim submission and monitoring process 10 may preprocess claims that were generated on a dealer management system (e.g., DMS 114) prior to submitting the same to the claim service processor (e.g., claim service processor 116), so that any defects included within the claims (e.g., claim 112) may be identified. Accordingly and by proactively identifying defects within the claims (e.g., claim 112), as opposed to waiting for the claims to be rejected by the claim service processor (e.g., claim service processor 116), the claim submission and reimbursement process may be made more efficient.

Figure 3:
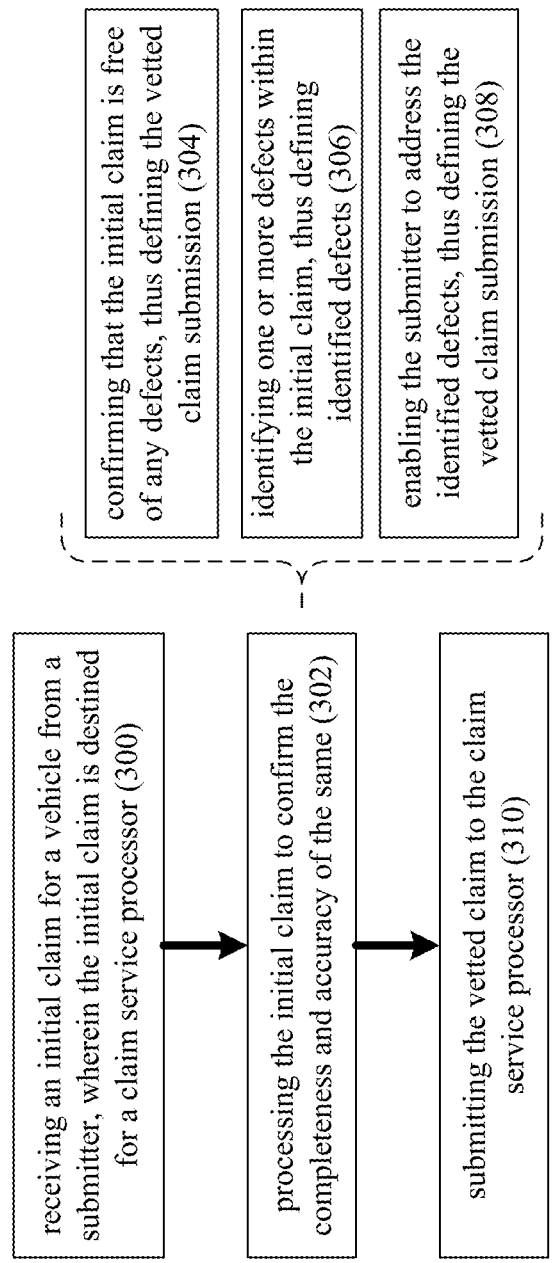
FIG. 3 is a flowchart of an implementation of the claim submission and monitoring process of FIG. 1 according to an implementation of the present disclosure.

Referring also to FIG. 3, claim submission and monitoring process 10 may receive 300 an initial claim (e.g., claim 112) for a vehicle (e.g., vehicle 102) from a submitter (e.g., submitter 118). This initial claim (e.g., claim 112) may be destined for a claim service processor (e.g., claim service processor 116).

This initial claim (e.g., claim 112) may concern one or more of: a covered maintenance claim for the vehicle; an over-the-counter parts claim for the vehicle; a transportation damage claim for the vehicle; a pre-delivery inspection claim for the vehicle; a warranty claim for the vehicle (e.g., vehicle 102); and a recall for the vehicle (e.g., vehicle 102).

Covered maintenance claims for vehicles are requests submitted by interested parties to automakers for reimbursement of maintenance costs covered under the manufacturer's maintenance program.

Over-the-counter parts claims for vehicles are requests submitted by interested parties to automakers for reimbursement of the cost of parts covered under the manufacturer's warranty.

Transportation damage claims for vehicles are requests submitted by interested parties to automakers for reimbursement of repair costs resulting from damage that occurred when transporting a vehicle to e.g., a dealership for sale/distribution.

Pre-delivery inspection claims for vehicles are requests submitted by interested parties to automakers for reimbursement of costs associated with a pre-delivery inspection associated with a vehicle.

Warranty claims for vehicles are requests submitted by interested parties to automakers for reimbursement of repair or replacement costs covered under the manufacturer's warranty. These claims arise when a vehicle owner encounters a defect or issue within the warranty period, such as faulty components or manufacturing defects. The dealer performs the necessary repairs and submits the claim, detailing the problem, corrective action, and associated costs. If the automaker approves the claim, the dealer is reimbursed. This system ensures that customers receive cost-free repairs for covered issues, enhancing trust in the brand.

Recalls, on the other hand, are initiated by the automaker or mandated by regulatory agencies when a defect or safety issue affects a significant number of vehicles. Recalls address problems that could compromise vehicle safety or performance, such as malfunctioning brakes, airbags, or emissions systems. Automakers notify affected customers, who can then bring their vehicles to authorized dealers for free repairs or replacements. Unlike warranty claims, recalls are usually not limited by time or mileage since they involve public safety. While recalls demonstrate a commitment to addressing safety concerns, they can also impact an automaker's reputation and incur significant costs.

While the vehicle (e.g., vehicle 102) is discussed above as being an automobile, this is for illustrative purposes only. Specifically, this vehicle (e.g., vehicle 102) may be one of: a private vehicle; a commercial vehicle; a watersport vehicle; a heavy equipment vehicle; an aircraft; and a fleet vehicle.

Private Vehicle: A private vehicle is a personal mode of transportation owned by an individual or family, primarily for non-commercial use. Examples include cars, motorcycles, and small vans used for commuting, leisure travel, or errands. These vehicles are designed for convenience, comfort, and affordability, often tailored to personal preferences and lifestyles.

Commercial Vehicle: A commercial vehicle is used primarily for business purposes, such as transporting goods, passengers, or providing services. Examples include delivery trucks, taxis, buses, and tractor-trailers. These vehicles are often subject to stricter regulations and inspections due to their operational demands and potential impact on public safety.

Watersport Vehicle: Watersport vehicles are designed for recreational activities on water. Examples include fishing boats, jet skis, speedboats, and water scooters. These vehicles are built for speed, agility, and fun on lakes, rivers, or coastal waters, often equipped with specialized features for towing wakeboards or water skis.

Heavy Equipment Vehicle: Heavy equipment vehicles are specialized machines used in construction, agriculture, mining, or industrial operations. Examples include excavators, bulldozers, cranes, and tractors. These vehicles are designed for high performance, durability, and efficiency in demanding tasks such as earthmoving, lifting, or hauling.

Aircraft: Aircraft are vehicles designed for air travel and transportation. They range from private planes and helicopters to commercial airliners and cargo planes. Aircraft are engineered to meet stringent safety and performance standards, with uses spanning personal travel, military operations, commercial transport, and emergency services.

Fleet Vehicle: A fleet vehicle is part of a group of vehicles owned or leased by a business, government, or organization for operational purposes. Examples include company cars, delivery vans, and service trucks. Fleet vehicles are managed collectively to optimize efficiency, reduce costs, and ensure consistent branding and maintenance standards.

Examples of the fleet vehicle may include one or more of: a corporate vehicle; a rideshare vehicle; and a rental vehicle.

Corporate Vehicle: A corporate vehicle is owned or leased by a business for use by its employees to conduct company activities. These vehicles may include sedans, SUVs, or vans and are typically used for tasks like client visits, transportation of goods, or attending business events. Corporate vehicles are often maintained by the company and may feature branding, such as logos or advertisements.

Rideshare Vehicle: A rideshare vehicle is a personal or leased vehicle used by a driver to provide transportation services through ridesharing platforms like Uber or Lyft. These vehicles are utilized to transport passengers from one location to another for a fee. Rideshare vehicles must meet specific platform requirements, such as age, condition, and safety standards, and are a popular choice for individuals seeking flexible transportation options.

Rental Vehicle: A rental vehicle is owned by a rental company and temporarily leased to customers for personal or business use. These vehicles range from compact cars to trucks and luxury models, allowing customers to select a vehicle based on their needs. Rental vehicles are typically provided for short-term use, and companies maintain them to ensure reliability and safety for a broad customer base.

Examples of the submitter (e.g., submitter 118) may include one or more of: an authorized service center associated with the vehicle; a dealership (e.g., dealership 106) associated with the vehicle (e.g., vehicle 102); a repair shop (e.g., repair shop 120) servicing the vehicle (e.g., vehicle 102); and a company (e.g., company 122) associated with the vehicle (e.g., vehicle 102).

Authorized Service Center Associated with the Vehicle: An authorized service center is an authorized facility for diagnosing, maintaining, and repairing vehicles. These authorized facilities may be independent shops not affiliated with a specific dealership or original equipment manufacturer. Additionally/alternatively, these authorized facilities may be dealer affiliated service centers with which e.g., dealerships or original equipment manufacturer have contracted to provide such services to such vehicles. An authorized service center may include mobile repair capability, such as e.g., remote Over-the-Air (OTA) repairs and/or physical mobile repair services, wherein a mechanic travels to the vehicle in a van/truck Dealership Associated with the Vehicle: A dealership (e.g., dealership 106) is a business authorized by an automaker to sell and service its vehicles. Dealerships act as intermediaries between manufacturers and customers, offering new or used vehicles for purchase or lease. They often provide additional services such as financing, trade-ins, and maintenance packages. Authorized dealerships typically have access to genuine parts and are trained to handle warranty claims and recalls for the automaker's vehicles, ensuring brand-standard service.

Repair Shop Servicing the Vehicle: A repair shop (e.g., repair shop 120) is a facility specializing in diagnosing, maintaining, and repairing vehicles. These can be independent shops, dealership-affiliated service centers, or chains like Midas or Pep Boys. Repair shops handle a variety of services, including routine maintenance (oil changes, tire rotations) and more complex repairs (engine, transmission, or electrical issues). They may cater to multiple brands or specialize in specific makes and models. High-quality repair shops use certified mechanics and often guarantee their work through warranties.

Company Associated with the Vehicle: A company (e.g., company 122) associated with the vehicle refers to businesses involved in the vehicle's lifecycle, aside from the dealership or repair shop. Examples include fleet companies, rental companies, etc.

The claim service processor (e.g., claim service processor 116) may be an original equipment manufacturer of the vehicle (e.g., vehicle 102) or a third-party warranty provider for the vehicle (e.g., vehicle 102).

Original Equipment Manufacturer (OEM) of the Vehicle: The Original Equipment Manufacturer (OEM) is the company that designs, manufactures, and markets the vehicle. Examples include automakers like Toyota, Ford, and Tesla. OEMs are responsible for producing the vehicle's components or sourcing them from approved suppliers, ensuring that the entire assembly meets quality and safety standards. They also provide the initial warranty that covers defects in materials or workmanship for a specified period or mileage. OEMs are integral to the vehicle's branding, innovation, and customer experience, as they often set the standards for performance, design, and support.

Third-Party Warranty Provider for the Vehicle: A third-party warranty provider is an independent company that offers extended warranty or service contracts for vehicles beyond the coverage provided by the OEM. These warranties typically cover repair costs for mechanical breakdowns or failures not caused by accidents or wear and tear. Unlike OEM warranties, which are included with the vehicle at no extra charge, third-party warranties are purchased separately, often at the end of the OEM coverage period. While they provide flexibility and additional peace of mind, the coverage terms, claim processes, and reliability of third-party providers can vary significantly, making it important for customers to review contracts carefully.

Claim submission and monitoring process 10 may process 302 the initial claim (e.g., claim 112) to confirm the completeness and accuracy of the same, thus defining a vetted claim (e.g., vetted claim 124).

As will be explained below in greater detail, Machine learning (ML) and artificial intelligence (AI) can play a transformative role in streamlining warranty claim management for dealerships by analyzing past submissions and rejection patterns. Here's how this process works:

Data Collection and Analysis: AI systems collect historical data on submitted warranty claims, including details of the claims (e.g., parts, labor hours, fault codes), reasons for rejections, and approval outcomes. Natural Language Processing (NLP) can analyze text-based notes or comments from claims and rejection notices, extracting patterns and key reasons for rejection.

Pattern Recognition: ML algorithms identify recurring issues or anomalies in rejected claims, such as missing documentation, non-compliance with repair protocols, or exceeding cost/time limits. The system learns from these patterns and builds predictive models to evaluate the likelihood of new claims being rejected for similar reasons.

Real-Time Vetting of New Claims: When a dealership submits a new claim, the AI system compares it against the learned patterns. It flags potential issues, such as incomplete information, mismatches with warranty coverage, or deviations from approved guidelines. The system can suggest corrective actions, such as providing additional documentation or revising cost estimates, before submission.

Feedback and Continuous Improvement: The AI system continuously updates its model based on new claims and outcomes, refining its ability to detect potential rejection risks over time. It also provides actionable insights to dealerships, helping them improve their submission processes and align better with manufacturer requirements.

Proactive Compliance: By integrating AI-driven vetting into the warranty claim workflow, dealerships can minimize errors, reduce rejections, and improve claim approval rates. This not only saves time and effort but also fosters a stronger relationship with the automaker by demonstrating consistent compliance and efficiency.

Overall, AI and ML empower dealerships to enhance their warranty claim management, reduce financial losses from rejected claims, and improve operational efficiency.

For example and when processing 302 the initial claim (e.g., claim 112) to confirm the completeness and accuracy of the same (thus defining a vetted claim 124), claim submission and monitoring process 10 may confirm 304 that the initial claim (e.g., claim 112) is free of any defects. Alternatively and when processing 302 the initial claim (e.g., claim 112) to confirm the completeness and accuracy of the same (thus defining a vetted claim 124), claim submission and monitoring process 10 may identify 306 one or more defects within the initial claim (e.g., claim 112) and may enable 308 the submitter (e.g., submitter 118) to address identified defects 126.

Once claim submission and monitoring process 10 confirms 304 that the initial claim (e.g., claim 112) is free of any defects or (if defects are identified) enables 308 the submitter (e.g., submitter 118) to address the identified defects (e.g., identified defects 126), claim submission and monitoring process 10 may submit 310 the vetted claim (e.g., vetted claim 124) to the claim service processor (e.g., claim service processor 116).

For example, claim submission and monitoring process 10 may monitor claims (e.g., claim 112) that are submitted to the claim service processor (e.g., claim service processor 116) and may associate those claim submissions with any rejections that may have been received from the submitter (e.g., submitter 118). Over time, claim submission and monitoring process 10 may generate a database (e.g., database 128) that defines best practices for submitting claims.

As discussed above, machine learning (ML) and artificial intelligence (AI) may play a transformative role in streamlining warranty claim management for dealerships by analyzing past submissions and rejection patterns. Accordingly, claim submission and monitoring process 10 may utilize AI process 130 to identify patterns within the content of the database (e.g., database 128).

For example and by utilizing AI process 130, claim submission and monitoring process 10 may extract patterns from database 128 that may indicate that claims e.g., are always rejected when they are submitted without a photograph of the VIN tag of the vehicle (e.g., vehicle 102); or that claims are always rejected when they request reimbursement for a rental car for a repair that requires less than two hours of labor; or that claims are always rejected when they fail to select a body type (e.g., two door, four door, hatchback, wagon, etc.); or that claims are always rejected when the technician assigned to the repair order is not identified.

Accordingly and through the use of such identified patterns, claim submission and monitoring process 10 may process 302 the initial claim (e.g., claim 112) to confirm the completeness and accuracy of the same, wherein claim submission and monitoring process 10 may confirm 304 that the initial claim (e.g., claim 112) is free of any defects or (if defects are identified) enable 308 the submitter (e.g., submitter 118) to address the identified defects (e.g., identified defects 126). Once processed 302, claim submission and monitoring process 10 may submit 310 the vetted claim (e.g., vetted claim 124) to the claim service processor (e.g., claim service processor 116), thus streamlining the process of claim submission to the claim service processor (e.g., claim service processor 116).

Concept 2—Chirp

As discussed above, claim submission and monitoring process 10 may preprocess claims that were generated on a dealer management system (e.g., DMS 114) prior to submitting the same to the claim service processor (e.g., claim service processor 116), so that any defects included within the claims (e.g., claim 112) may be addressed.

However, what happens when a defect within the claims (e.g., claim 112) is identified. Naturally, the quicker these defects are addressed, the more quickly the claim (e.g., claim 112) will be processed and the submitter (e.g., submitter 118) will be reimbursed. Accordingly and as will be discussed below in better detail, claim submission and monitoring process 10 may proactively notify the submitter (e.g., submitter 118) in the event that a claim (e.g., claim 112) has a defect and may also assist the submitter (e.g., submitter 118) in addressing such defect.

Figure 4:
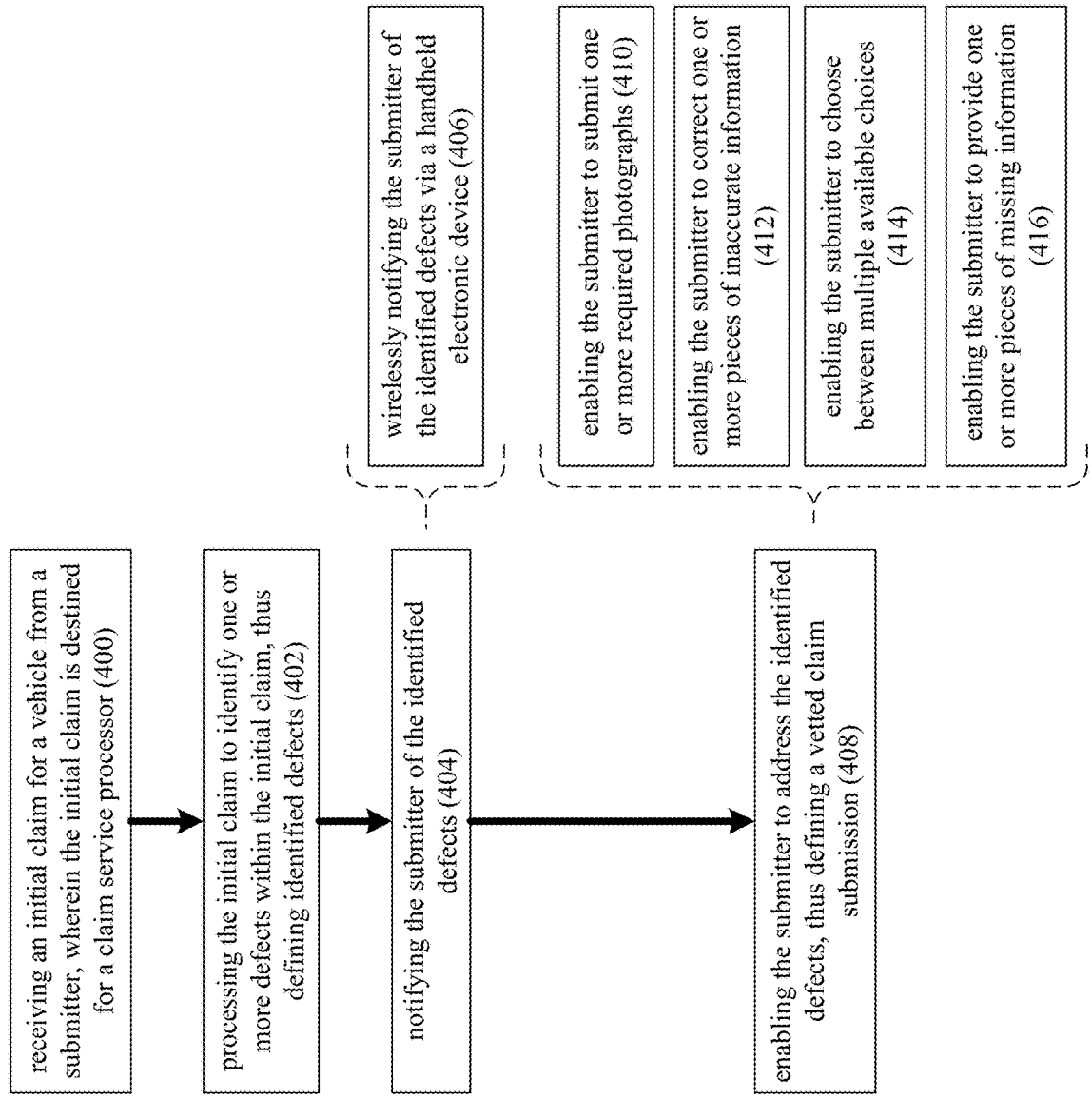
FIG. 4 is a flowchart of another implementation of the claim submission and monitoring process of FIG. 1 according to an implementation of the present disclosure.

Referring also to FIG. 4 and as discussed above, claim submission and monitoring process 10 may receive 400 an initial claim (e.g., claim 112) for a vehicle (e.g., vehicle 102) from a submitter (e.g., submitter 118). This initial claim (e.g., claim 112) may be destined for a claim service processor (e.g., claim service processor 116). As discussed above, this initial claim (e.g., claim 112) may concern one or more of: a warranty claim for the vehicle (e.g., vehicle 102); and a recall for the vehicle (e.g., vehicle 102).

Claim submission and monitoring process 10 may process 402 the initial claim (e.g., claim 112) to identify one or more defects within the initial claim (e.g., claim 112), thus defining identified defects (e.g., identified defects 126). As discussed above, such defects may be defined via AI process 130 and examples may include but are not limited to: the omission of a photograph of the VIN tag of the vehicle (e.g., vehicle 102) and requesting reimbursement for a rental car for a repair that requires less than two hours of labor.

Accordingly and in the event of identified defects (e.g., identified defects 126), claim submission and monitoring process 10 may notify 404 the submitter (e.g., submitter 118) of such identified defects (e.g., identified defects 126). When notifying 404 the submitter (e.g., submitter 118) of the identified defects (e.g., identified defects 126), claim submission and monitoring process 10 may wirelessly notify 406 the submitter (e.g., submitter 118) of the identified defects (e.g., identified defects 126) via a handheld electronic device (e.g., data-enabled, cellular telephone 28).

For example, a native or web-based application may accessed on a data-enabled cellular telephone and/or a local application (e.g., application 132) may be installed on data-enabled cellular telephone 28 so that, in the event that identified defects 126 are present within initial claim (e.g., claim 112), claim submission and monitoring process 10 may wirelessly notify 406 submitter 118 of identified defects 126 via application 132. Accordingly, the application (e.g., application 132) executed on data-enabled cellular telephone 28 may e.g., open a notification window on the display of data-enabled cellular telephone 28, provide an audible notification (such as a chirp) on data-enabled cellular telephone 28, provide a tactile notification (such as a vibration) on data-enabled cellular telephone 28, etc. Accordingly and through the use of such a wireless notification system, the need to physically locate (or interact with) e.g., service managers, service advisors, technicians, etc. may be reduced/eliminated.

Further, claim submission and monitoring process 10 may enable 408 the submitter (e.g., submitter 118) to address the identified defects (e.g., identified defects 126), thus defining a vetted claim (e.g., vetted claim 124). The manner in which the submitter (e.g., submitter 118) addresses the identified defects (e.g., identified defects 126) may vary depending upon the type of defects identified.

For example and when enabling 408 the submitter (e.g., submitter 118) to address the identified defects (e.g., identified defects 126), claim submission and monitoring process 10 may enable 410 the submitter (e.g., submitter 118) to submit one or more required photographs (e.g., photograph 134). As discussed above, if the defect is the omission of a photograph of the VIN tag of the vehicle (e.g., vehicle 102), claim submission and monitoring process 10 may enable 410 the submitter (e.g., submitter 118) to submit a photograph of the VIN tag (e.g., photograph 134).

Further and when enabling 408 the submitter (e.g., submitter 118) to address the identified defects (e.g., identified defects 126), claim submission and monitoring process 10 may enable 412 the submitter (e.g., submitter 118) to correct one or more pieces of inaccurate information (e.g., inaccurate information 136). As discussed above, if the defect is requesting reimbursement for a rental car for a repair that requires less than two hours of labor, claim submission and monitoring process 10 may enable 412 the submitter (e.g., submitter 118) to remove the reimbursement request for a rental car.

Additionally and when enabling 408 the submitter (e.g., submitter 118) to address the identified defects (e.g., identified defects 126), claim submission and monitoring process 10 may enable 414 the submitter (e.g., submitter 118) to choose between multiple available choices (e.g., choices 138). As discussed above, if the defect is the failure select a body type (e.g., two door, four door, hatchback, wagon, etc.), claim submission and monitoring process 10 may enable 414 the submitter (e.g., submitter 118) to choose between multiple available body types (e.g., two door, four door, hatchback, wagon, etc.).

Further and when enabling 408 the submitter (e.g., submitter 118) to address the identified defects, claim submission and monitoring process 10 may enable 416 the submitter (e.g., submitter 118) to provide one or more pieces of missing information (e.g., missing information 140). As discussed above, if the defect is the failure to identify the technician assigned to the repair order, claim submission and monitoring process 10 may enable 416 the submitter (e.g., submitter 118) to provide the identity of the technician assigned to the repair order (e.g., missing information 140)

Accordingly and through the use of such identified rejection patterns, claim submission and monitoring process 10 may process 402 the initial claim (e.g., claim 112) to identify one or more defects within the initial claim (e.g., claim 112), wherein claim submission and monitoring process 10 may enable 408 the submitter (e.g., submitter 118) to address the identified defects (e.g., identified defects 126). Once such defects are processed and addressed, claim submission and monitoring process 10 may submit 418 the vetted claim (e.g., vetted claim 124) to the claim service processor (e.g., claim service processor 116), thus streamlining the process of claim submission to the claim service processor (e.g., claim service processor 116).

Concept 3—Automated Claim Submissions

As discussed above, claim submission and monitoring process 10 may preprocess claims that were generated on a dealer management system (e.g., DMS 114) prior to submitting the same to the claim service processor (e.g., claim service processor 116), so that any defects included within the claims (e.g., claim 112) may be identified.

However, what happens if a claim (e.g., claim 112) is submitted to the claim service processor (e.g., claim service processor 116) and that claim (e.g., claim 112) is subsequently rejected due to defects? Again, the quicker these defects are addressed, the more quickly the claim (e.g., claim 112) will be processed and the submitter (e.g., submitter 118) will be reimbursed. Accordingly and as will be discussed below in detail, claim submission and monitoring process 10 may automatically amend and resubmit a claim (e.g., claim 112) to the claim service processor (e.g., claim service processor 116) if it has been rejected due to defects in the claim (e.g., claim 112).

Figure 5:
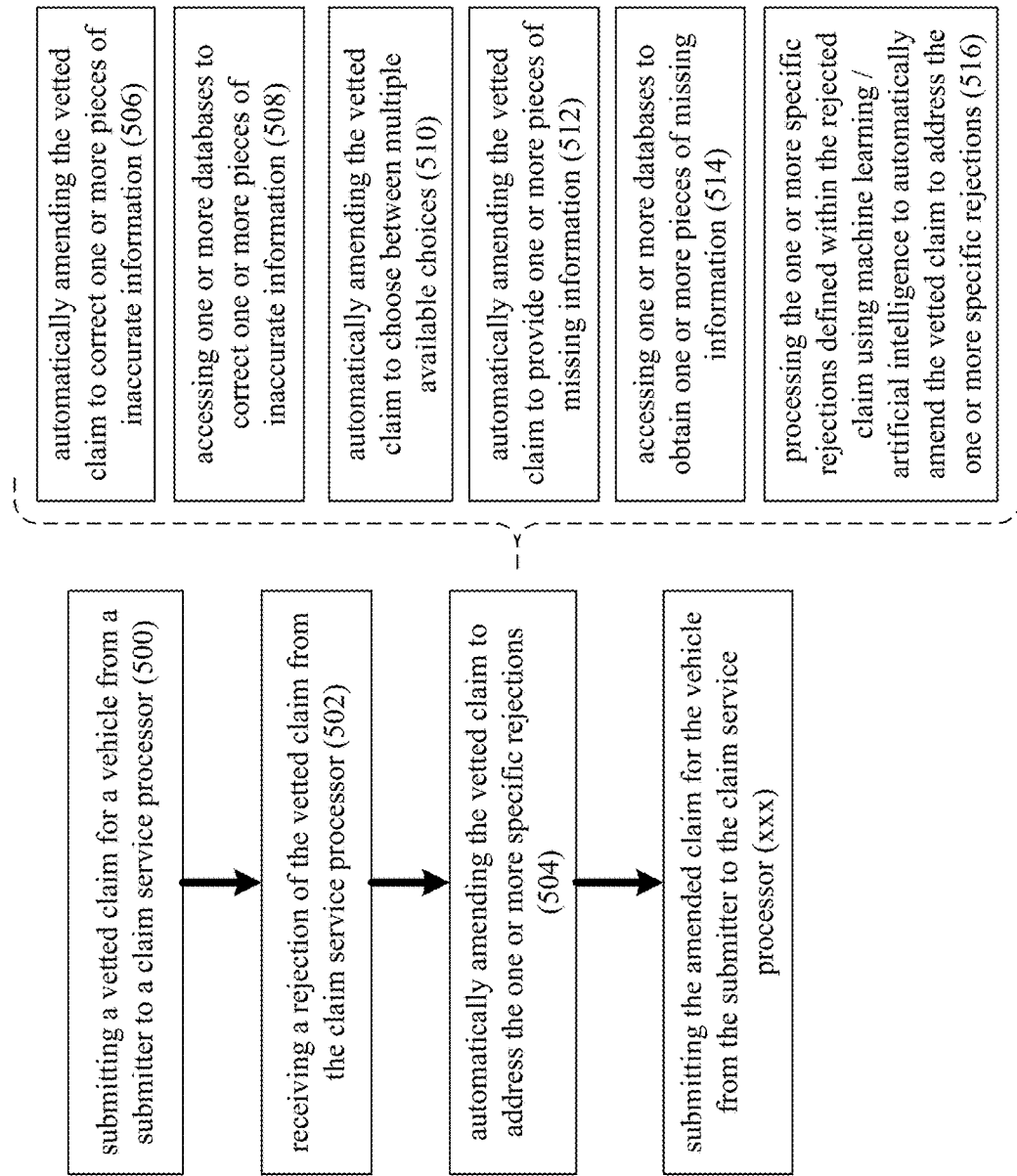
FIG. 5 is a flowchart of another implementation of the claim submission and monitoring process of FIG. 1 according to an implementation of the present disclosure.

Referring also to FIG. 5 and as discussed above, claim submission and monitoring process 10 may submit 500 a vetted claim (e.g., vetted claim 124) for a vehicle (e.g., vehicle 102) from a submitter (e.g., submitter 118) to a claim service processor (e.g., claim service processor 116). For example, once the above-described process of prescreening the initial claim (e.g., claim 112) and identifying defects (e.g., identified defects 126) within the same, the vetted claim (e.g., vetted claim 124) may be defined. Accordingly and once claim submission and monitoring process 10 defines the vetted claim (e.g., vetted claim 124), claim submission and monitoring process 10 may submit 500 the vetted claim (e.g., vetted claim 124) to the claim service processor (e.g., claim service processor 116).

At some point after the vetted claim (e.g., vetted claim 124) is submitted 500 to the claim service processor (e.g., claim service processor 116), the claim service processor (e.g., claim service processor 116) will either reject the vetted claim (e.g., vetted claim 124) or accept and pay the vetted claim (e.g., vetted claim 124). Assume for the following example that the vetted claim (e.g., vetted claim 124) is rejected by claim service processor (e.g., claim service processor 116).

Accordingly, claim submission and monitoring process 10 may receive 502 a rejection of the vetted claim (e.g., vetted claim 124) from the claim service processor (e.g., claim service processor 116), thus defining a rejected claim (e.g. rejected claim 142) that identifies one or more specific rejections (e.g., rejection 144).

In response to receiving 502 such a rejection of the vetted claim (e.g., vetted claim 124) from the claim service processor (e.g., claim service processor 116), claim submission and monitoring process 10 may automatically amend 504 the vetted claim (e.g., vetted claim 124) to address the one or more specific rejections (e.g., rejection 144). Once the one or more specific rejections (e.g., rejection 144) are addressed, an amended claim (e.g., amended claim 146) may be defined.

The manner in which claim submission and monitoring process 10 automatically amends 504 the vetted claim (e.g., vetted claim 124) to address the one or more specific rejections (e.g., rejection 144) may vary depending upon the type of the specific rejections (e.g., rejection 144).

For example and when automatically amending 504 the vetted claim (e.g., vetted claim 124) to address the one or more specific rejections (e.g., rejection 144), claim submission and monitoring process 10 may automatically amend 506 the vetted claim (e.g., vetted claim 124) to correct one or more pieces of inaccurate information (e.g., inaccurate information 136). As discussed above, if the rejection (e.g., rejection 144) is based upon the defect of requesting reimbursement for a rental car for a repair that requires less than two hours of labor, claim submission and monitoring process 10 may amend 506 the vetted claim (e.g., vetted claim 124) to remove the reimbursement request for a rental car.

When automatically amending 504 the vetted claim (e.g., vetted claim 124) to address the one or more specific rejections (e.g., rejection 144), claim submission and monitoring process 10 may access 508 one or more databases (e.g., database 148) to correct one or more pieces of inaccurate information (e.g., inaccurate information 136). Examples of such databases (e.g., database 148) may include one or more databases accessible to the submitter (e.g., submitter 118), such as databases accessible to the dealer management system (e.g., DMS 114).

These databases (e.g., database 148) may define: information concerning the specifics of the vehicle (e.g., vehicle 102), information concerning the warranty of the vehicle (e.g., vehicle 102), information concerning the financing of the vehicle (e.g., vehicle 102), information concerning the maintenance history of the vehicle (e.g., vehicle 102), and information concerning the recall history of the vehicle (e.g., vehicle 102).

Additionally and when automatically amending 504 the vetted claim (e.g., vetted claim 124) to address the one or more specific rejections (e.g., rejection 144), claim submission and monitoring process 10 may automatically amend 510 the vetted claim (e.g., vetted claim 124) to choose between multiple available choices (e.g., choices 138). As discussed above, if the rejection (e.g., rejection 144) is based upon the defect of failing to select a body type (e.g., two door, four door, hatchback, wagon, etc.), claim submission and monitoring process 10 may amend 510 the vetted claim (e.g., vetted claim 124) to choose between multiple available body types (e.g., two door, four door, hatchback, wagon, etc.).

Further and when automatically amending 504 the vetted claim (e.g., vetted claim 124) to address the one or more specific rejections (e.g., rejection 144), claim submission and monitoring process 10 may automatically amend 512 the vetted claim (e.g., vetted claim 124) to provide one or more pieces of missing information (e.g., missing information 140). As discussed above, if the rejection (e.g., rejection 144) is based upon the defect of failing to identify the technician assigned to the repair order, claim submission and monitoring process 10 may amend 512 the vetted claim (e.g., vetted claim 124) to provide the identity of the technician assigned to the repair order (e.g., missing information 140)

When automatically amending 504 the vetted claim (e.g., vetted claim 124) to address the one or more specific rejections (e.g., rejection 144), claim submission and monitoring process 10 may access 514 one or more databases (e.g., databases 148) to obtain one or more pieces of missing information (e.g., missing information 140). As discussed above, examples of such databases (e.g., database 148) may include one of more databases accessible to the submitter (e.g., submitter 118), such as databases accessible to the dealer management system (e.g., DMS 114).

As discussed above, these databases (e.g., database 148) may define: information concerning the specifics of the vehicle (e.g., vehicle 102), information concerning the warranty of the vehicle (e.g., vehicle 102), information concerning the financing of the vehicle (e.g., vehicle 102), information concerning the maintenance history of the vehicle (e.g., vehicle 102), and information concerning the recall history of the vehicle (e.g., vehicle 102).

Additionally and when automatically amending 504 the vetted claim (e.g., vetted claim 124) to address the one or more specific rejections (e.g., rejection 144), claim submission and monitoring process 10 may process 516 the one or more specific rejections (e.g., rejection 144) defined within the rejected claim (e.g. rejected claim 142) using machine learning/artificial intelligence to automatically amend the vetted claim (e.g., vetted claim 124) to address the one or more specific rejections (e.g., rejection 144).

As discussed above, machine learning (ML) and artificial intelligence (AI) can play a transformative role in streamlining warranty claim management for dealerships by analyzing past submissions and rejection patterns. Accordingly, claim submission and monitoring process 10 may utilize AI process 130 to identify patterns within the content of the database (e.g., database 128).

Once the vetted claim (e.g., vetted claim 124) is automatically amended 504 to define the amended claim (e.g., amended claim 146), claim submission and monitoring process 10 may submit 518 the amended claim (e.g., amended claim 146) for the vehicle (e.g., vehicle 102) from the submitter (e.g., submitter 118) to the claim service processor (e.g., claim service processor 116).

Accordingly and through the use of such identified rejection patterns, claim submission and monitoring process 10 may automatically amended 504 the vetted claim (e.g., vetted claim 124) to address the one or more specific rejections (e.g., rejection 144) and define the amended claim (e.g., amended claim 146). Once defined, claim submission and monitoring process 10 may submit 518 the amended claim (e.g., amended claim 146) for the vehicle (e.g., vehicle 102) to the claim service processor (e.g., claim service processor 116) on behalf of the submitter (e.g., submitter 118).

Concept 4—New Claim/New Bot

As is known in the art, a bot in the context of software is a program designed to perform automated tasks, often mimicking human actions to enhance efficiency, streamline processes, or improve user experiences. Bots can handle a wide range of functions, from simple, repetitive tasks to more complex operations requiring artificial intelligence. For instance, chatbots interact with users in natural language, commonly used for customer service or virtual assistance. Web crawlers, also known as spiders, scan and index internet content for search engines. In gaming, bots may simulate players or assist users with in-game tasks, while social media bots automate activities like content posting or engagement. Some bots are transactional, helping users shop or manage finances, while others, unfortunately, serve malicious purposes, such as spreading malware or conducting cyberattacks. Depending on their design, bots operate based on rules, algorithms, or machine learning models, working independently or integrating with other systems.

These bots may be stored for deployment/utilization in a bot repository (e.g., claim processing bot repository 150). A bot repository is a centralized collection or platform where pre-built bots are stored, shared, and managed, making them readily deployable for specific tasks. These repositories serve as libraries or marketplaces for bots that are designed to perform a range of functions, such as customer service, data scraping, task automation, or social media management. They often include documentation, configuration options, and deployment tools, allowing users to customize the bots for their particular needs. For example, repositories like GitHub or GitLab can host bot projects that developers can clone, modify, and deploy. Platforms like Dialogflow, Microsoft Bot Framework, or Rasa may also maintain their own repositories of sample bots, templates, or modules optimized for specific use cases, such as virtual assistants or customer support agents. In some cases, these repositories are integrated into larger ecosystems, enabling users to deploy bots seamlessly on platforms like Slack, WhatsApp, or Microsoft Teams. By offering a repository of task-specific bots, developers and organizations can quickly implement solutions, reduce development time, and address specific challenges without building from scratch.

For the following discussion, assume that the bots that are included within the bot repository (e.g., claim processing bot repository 150) were all previously generated by claim submission and monitoring process 10 while servicing earlier-received claims. Accordingly and as will be discussed below in greater detail, whenever a new claim is received for processing by claim submission and monitoring process 10, claim submission and monitoring process 10 may examine the existing bots defined/included within claim processing bot library 150 to determine whether the newly-received claim may be processed using an existing bot defined within claim processing bot repository 150 (to avoid continuously generating a new bot for every newly-received claim).

Figure 6:
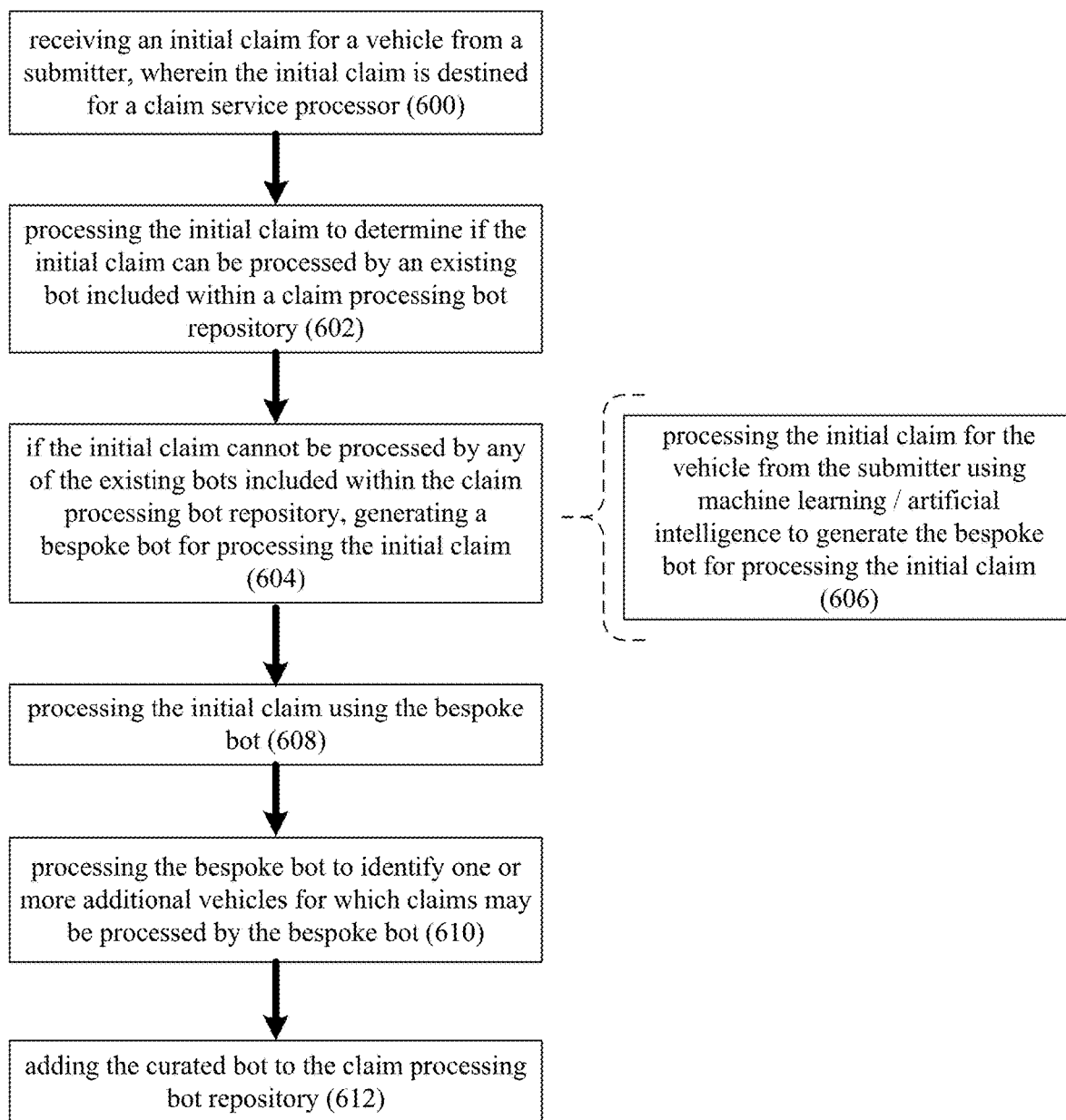
FIG. 6 is a flowchart of another implementation of the claim submission and monitoring process of FIG. 1 according to an implementation of the present disclosure.

Referring also to FIG. 6 and as discussed above, claim submission and monitoring process 10 may receive 600 an initial claim (e.g., claim 112) for a vehicle (e.g., vehicle 102) from a submitter (e.g., submitter 118). This initial claim (e.g., claim 112) may be destined for a claim service processor (e.g., claim service processor 116). As discussed above, this initial claim (e.g., claim 112) may concern one or more of: a warranty claim for the vehicle (e.g., vehicle 102); and a recall for the vehicle (e.g., vehicle 102).

Claim submission and monitoring process 10 may process 602 the initial claim (e.g., claim 112) to determine if the initial claim (e.g., claim 112) can be processed by an existing bot included within a claim processing bot repository (e.g., claim processing bot repository 150).

For example, assume that the initial claim (e.g., claim 112) concerns a warranty claim for a 2022 Toyota Camry LE. Accordingly and when received from e.g., the dealer management system (e.g., DMS 114) of the submitter (e.g., submitter 118), claim submission and monitoring process 10 may process 602 the initial claim (e.g., claim 112) to determine if the initial claim (e.g., claim 112) can be processed by an existing bot included within a claim processing bot repository (e.g., claim processing bot repository 150).

Specifically, claim submission and monitoring process 10 may process 602 the initial claim (e.g., claim 112) to determine whether any of the bots included within a claim processing bot repository (e.g., claim processing bot repository 150) are capable of processing warranty claims for a 2022 Toyota Camry LE. As is known in the art, the 2022 Toyota Camry LE is a member of the XV70 series of Camrys that were produced from 2017-2023. Accordingly, if a bot included within the claim processing bot repository (e.g., claim processing bot repository 150) is defined for the XV70 series of Camrys (i.e., for the 2017-2023 series of Camrys), that specific bot may be capable of processing warranty claims for a 2022 Toyota Camry LE.

If the initial claim (e.g., claim 112) cannot be processed by any of the existing bots included within the claim processing bot repository (e.g., claim processing bot repository 150), claim submission and monitoring process 10 may generate 604 a bespoke bot (e.g., bespoke bot 152) for processing the initial claim (e.g., claim 112). For this example, assume that the claim processing bot repository (e.g., claim processing bot repository 150) includes a bot for processing warranty claims for the XV80 series of Camrys (i.e., 2023-present) and a bot for processing warranty claims for the XV50 series of Camrys (2011-2017) . . . but does not include a bot for processing claims for the XV70 series of Camrys (i.e., 2017-2023). Accordingly and upon making this determination, claim submission and monitoring process 10 may generate 604 a bespoke bot (e.g., bespoke bot 152) for processing this initial claim (e.g., claim 112) for this 2022 Toyota Camry LE.

When generating 604 a bespoke bot (e.g., bespoke bot 152) for processing the initial claim (e.g., claim 112), claim submission and monitoring process 10 may process 606 the initial claim (e.g., claim 112) for the vehicle (e.g., vehicle 102) from the submitter (e.g., submitter 118) using machine learning/artificial intelligence to generate the bespoke bot (e.g., bespoke bot 152) for processing the initial claim (e.g., claim 112).

As discussed above, machine learning (ML) and artificial intelligence (AI) can play a transformative role in streamlining warranty claim management for dealerships by analyzing past submissions and rejection patterns. Accordingly, claim submission and monitoring process 10 may utilize AI process 130 to identify patterns within the content of the database (e.g., database 128).

Once the bespoke bot (e.g., bespoke bot 152) is generated 604, claim submission and monitoring process 10 may process 608 the initial claim (e.g., claim 112) using the bespoke bot (e.g., bespoke bot 152).

As discussed above, such processing 608 may include processing the initial claim (e.g., claim 112) to confirm the completeness and accuracy of the same (thus defining vetted claim 124), notifying the submitter (e.g., submitter 118) of any identified defects (e.g., identified defects 126), and/or enabling the submitter (e.g., submitter 118) to address the identified defects (e.g., identified defects 126), Claim submission and monitoring process 10 may process 610 the bespoke bot (e.g., bespoke bot 152) to identify one or more additional vehicles (e.g., additional vehicles 154) for which claims may be processed by the bespoke bot (e.g., bespoke bot 152), thus defining a curated bot (e.g., curated bot 156).

As discussed above, the bespoke bot (e.g., bespoke bot 152) is generated 604 specifically for this 2022 Toyota Camry LE. As also discussed above, this 2022 Toyota Camry LE is a member of the XV70 series of Camrys, which were produced from 2017-2023. Accordingly and when processing 610 the bespoke bot (e.g., bespoke bot 152) to identify one or more additional vehicles (e.g., additional vehicles 154) for which claims may be processed by the bespoke bot (e.g., bespoke bot 152), claim submission and monitoring process 10 may determine that the bespoke bot (e.g., bespoke bot 152) for this 2022 Toyota Camry LE is applicable for the XV70 series of Camrys, which were produced from 2017-2023. Therefore, the curated bot (e.g., curated bot 156) may be defined as being capable of processing warranty claims for the XV70 series of Camrys, which were produced from 2017-2023.

Claim submission and monitoring process 10 may add 612 the curated bot (e.g., curated bot 156) to the claim processing bot repository (e.g., claim processing bot repository 150). Specifically, the curated bot (e.g., curated bot 156) may be added 612 to the claim processing bot repository (e.g., claim processing bot repository 150) and defined as being applicable to the XV70 series of Camrys, which were produced from 2017-2023. Accordingly and in the event that a future claim concerns a 2019 Toyota Camry SE, claim submission and monitoring process 10 may utilize the curated bot (e.g., curated bot 156) within the claim processing bot repository (e.g., claim processing bot repository 150) to process such a claim.

Concept 5—Existing Claim/Existing Bot

Figure 7:
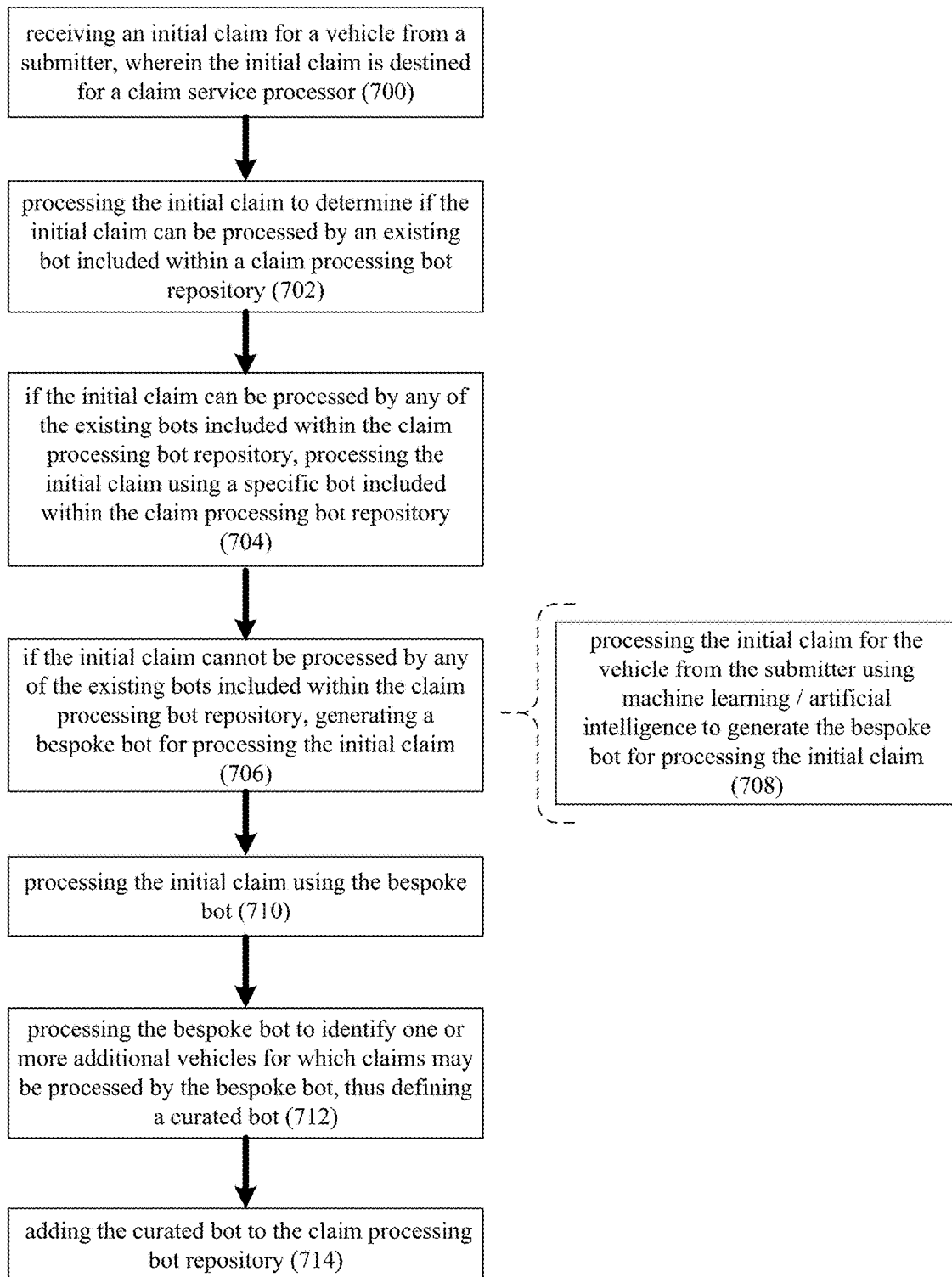
FIG. 7 is a flowchart of another implementation of the claim submission and monitoring process of FIG. 1 according to an implementation of the present disclosure.

Referring also to FIG. 7 and as discussed above, claim submission and monitoring process 10 may receive 700 an initial claim (e.g., claim 112) for a vehicle (e.g., vehicle 102) from a submitter (e.g., submitter 118). This initial claim (e.g., claim 112) may be destined for a claim service processor (e.g., claim service processor 116). As discussed above, this initial claim (e.g., claim 112) may concern one or more of: a warranty claim for the vehicle (e.g., vehicle 102); and a recall for the vehicle (e.g., vehicle 102).

Claim submission and monitoring process 10 may process 702 the initial claim (e.g., claim 112) to determine if the initial claim (e.g., claim 112) can be processed by an existing bot included within a claim processing bot repository (e.g., claim processing bot repository 150).

For this example, assume that the initial claim (e.g., claim 112) concerns a warranty claim for a 2019 Toyota Camry SE. Accordingly and when received from e.g., the dealer management system (e.g., DMS 114) of the submitter (e.g., submitter 118), claim submission and monitoring process 10 may process 702 the initial claim (e.g., claim 112) to determine if the initial claim (e.g., claim 112) can be processed by an existing bot included within a claim processing bot repository (e.g., claim processing bot repository 150).

Specifically, claim submission and monitoring process 10 may process 702 the initial claim (e.g., claim 112) to determine whether any of the bots included within a claim processing bot repository (e.g., claim processing bot repository 150) are capable of processing warranty claims for a 2019 Toyota Camry SE. As is known in the art, the 2019 Toyota Camry SE is a member of the XV70 series of Camrys that were produced from 2017-2023. Accordingly, if a bot included within the claim processing bot repository (e.g., claim processing bot repository 150) is defined for the XV70 series of Camrys (i.e., for the 2017-2023 series of Camrys), that specific bot may be capable of processing warranty claims for a 2019 Toyota Camry SE.

If the initial claim (e.g., claim 112) can be processed by any of the existing bots included within the claim processing bot repository (e.g., claim processing bot repository 150), claim submission and monitoring process 10 may process 704 the initial claim (e.g., claim 112) using a specific bot included within the claim processing bot repository (e.g., claim processing bot repository 150).

As discussed above, a curated bot (e.g., curated bot 156) was added to the claim processing bot repository (e.g., claim processing bot repository 150) and was defined as being applicable to the XV70 series of Camrys (which were produced from 2017-2023). Accordingly and in the event that a future claim concerns a Toyota Camry produced from 2017-2023, claim submission and monitoring process 10 may utilize this curated bot (e.g., curated bot 156) to process such a claim. Therefore and when claim submission and monitoring process 10 processes 702 the initial claim (e.g., claim 112) to determine whether any of the bots included within a claim processing bot repository (e.g., claim processing bot repository 150) are capable of processing warranty claims for a 2019 Toyota Camry SE, claim submission and monitoring process 10 may determine that the above-described curated bot (e.g., curated bot 156) is capable of processing a warranty claim (e.g., claim 112) for a 2019 Camry SE.

Accordingly, claim submission and monitoring process 10 may process 704 the initial claim (e.g., claim 112) for this 2019 Camry SE using a specific bot (e.g., curated bot 156) included within the claim processing bot repository (e.g., claim processing bot repository 150).

As discussed above, if the initial claim (e.g., claim 112) cannot be processed by any of the existing bots included within the claim processing bot repository (e.g., claim processing bot repository 150), claim submission and monitoring process 10 may generate 706 a bespoke bot (e.g., bespoke bot 158) for processing the initial claim (e.g., claim 112).

As discussed above, when generating 706 a bespoke bot (e.g., bespoke bot 158) for processing the initial claim (e.g., claim 112), claim submission and monitoring process 10 may process 708 the initial claim (e.g., claim 112) for the vehicle (e.g., vehicle 102) from the submitter (e.g., submitter 118) using machine learning/artificial intelligence to generate the bespoke bot (e.g., bespoke bot 158) for processing the initial claim (e.g., claim 112).

As discussed above, machine learning (ML) and artificial intelligence (AI) can play a transformative role in streamlining warranty claim management for dealerships by analyzing past submissions and rejection patterns. Accordingly, claim submission and monitoring process 10 may utilize AI process 130 to identify patterns within the content of the database (e.g., database 128).

As discussed above, once generated 706, claim submission and monitoring process 10 may process 710 the initial claim (e.g., claim 112) using the bespoke bot (e.g., bespoke bot 158).

As discussed above, claim submission and monitoring process 10 may process 712 the bespoke bot (e.g., bespoke bot 158) to identify one or more additional vehicles (e.g., additional vehicles 160) for which claims may be processed by the bespoke bot (e.g., bespoke bot 158), thus defining a curated bot (e.g., curated bot 162), wherein claim submission and monitoring process 10 may add 714 the curated bot (e.g., curated bot 162) to the claim processing bot repository (e.g., claim processing bot repository 150).

Concept 6—Claim Status

Figure 8:
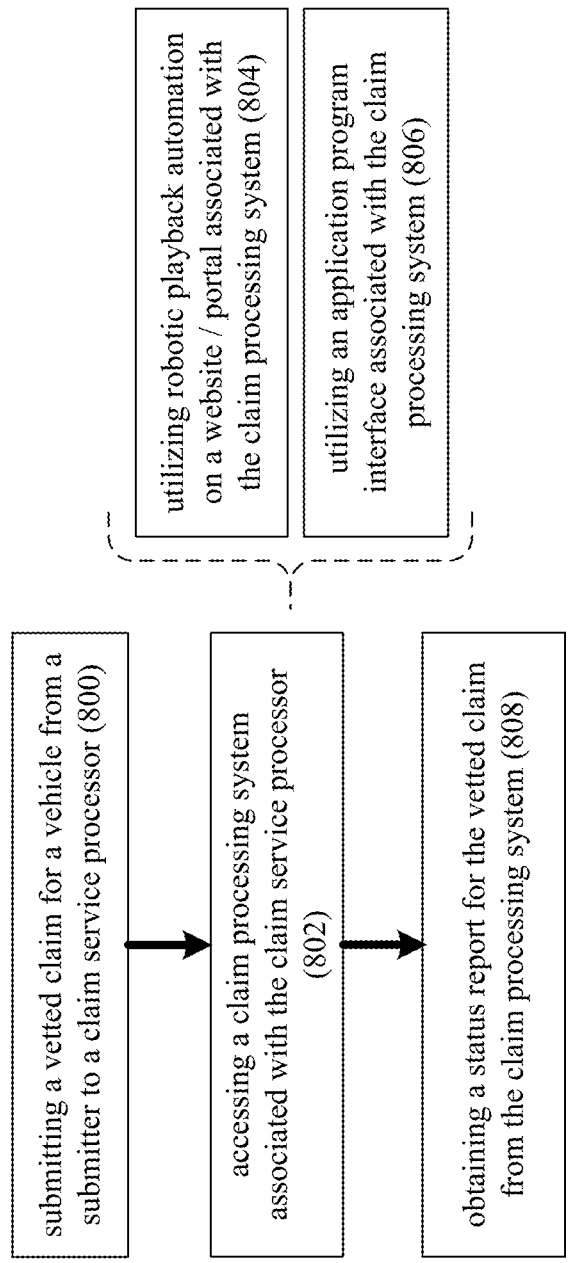
FIG. 8 is a flowchart of another implementation of the claim submission and monitoring process of FIG. 1 according to an implementation of the present disclosure.

Referring also to FIG. 8 and as discussed above, claim submission and monitoring process 10 may submit 800 a vetted claim (e.g., vetted claim 124) for a vehicle (e.g., vehicle 102) from a submitter (e.g., submitter 118) to a claim service processor (e.g., claim service processor 116). For example, once the above-described process of prescreening the initial claim (e.g., claim 112) and identifying defects (e.g., identified defects 126) within the same, the vetted claim (e.g., vetted claim 124) may be defined. Accordingly and once claim submission and monitoring process 10 defines the vetted claim (e.g., vetted claim 124), claim submission and monitoring process 10 may submit 800 the vetted claim (e.g., vetted claim 124) to the claim service processor (e.g., claim service processor 116).

Once submitted 800, claim submission and monitoring process 10 may access 802 a claim processing system (e.g., claim processing system 164) associated with the claim service processor (e.g., claim service processor 116).

A claim processing system (e.g., claim processing system 164) may be a software platform designed to manage and streamline the handling of warranty claims related to vehicle repairs, replacements, or services. This system is used by automakers, dealerships, service providers, and sometimes customers to ensure that warranty claims are processed efficiently and accurately. It allows service providers to submit claims with details such as the vehicle's information, repair specifics, parts used, and labor costs. The system validates the claim by checking the vehicle's warranty coverage, including eligibility based on mileage, service history, and warranty terms. Automated workflows expedite the approval process, while suspicious or non-compliant claims may be flagged for manual review. Once approved, the system facilitates payments or reimbursements to the service provider or customer. It also offers tracking features, enabling users to monitor claim statuses and generate reports to analyze trends or recurring issues. By automating repetitive processes and ensuring policy compliance, these systems improve efficiency, reduce errors, and help manage warranty-related costs. Additionally, they enhance customer satisfaction by providing transparency and faster claim resolutions, making them an essential tool in the automotive industry.

When accessing 802 a claim processing system (e.g., claim processing system 164) associated with the claim service processor (e.g., claim service processor 116), claim submission and monitoring process 10 may utilize 804 robotic playback automation on a website/portal (e.g., website/portal 166) associated with the claim processing system (e.g., claim processing system 164).

Robotic playback automation on a website or portal refers to the use of software tools, often leveraging Robotic Process Automation (RPA), to simulate and automate human interactions with a website's user interface. This involves recording a sequence of actions performed by a user, such as clicking buttons, filling out forms, or navigating through pages, and then replaying those actions automatically without human intervention. The recorded actions are translated into workflows or scripts, which can be customized to handle variations, such as different inputs or dynamic content. This technology is widely used for tasks like data entry, web testing, information extraction, and automating repetitive workflows. For example, a business might automate the process of logging into an online portal and uploading documents daily, saving significant time and reducing the chance of errors. Robotic playback automation increases efficiency, ensures accuracy, and scales easily to handle large volumes of work, making it a cost-effective solution for streamlining manual tasks.

When accessing 802 a claim processing system (e.g., claim processing system 164) associated with the claim service processor (e.g., claim service processor 116), claim submission and monitoring process 10 may utilize 806 an application program interface (e.g., API 168) associated with the claim processing system (e.g., claim processing system 164).

An API, or Application Programming Interface, is a set of rules and protocols that enable different software applications to communicate and share data or functionality. It acts as a bridge between systems, allowing one application to access specific features or information from another without needing to understand its internal workings. APIs work by defining endpoints—specific URLs where requests are sent—and supporting methods like GET (retrieve data), POST (send data), PUT (update data), and DELETE (remove data). When a client application sends a request to an API, the server processes it and responds with the requested data, often in a format like JSON or XML. Many APIs require authentication, such as API keys or tokens, to ensure secure and authorized access. For example, a weather app might use an API to fetch real-time weather data from a server, or a payment gateway might allow e-commerce platforms to process transactions. In essence, APIs simplify the integration and interaction between different systems, making it possible for applications to work together seamlessly.

Claim submission and monitoring process 10 may obtain 808 a status report (e.g., status report 170) for the vetted claim (e.g., vetted claim 124) from the claim processing system (e.g., claim processing system 164).

The status report (e.g., status report 170) for the vetted claim (e.g., vetted claim 124) may define one or more of:

A current status for the vetted claim (e.g., vetted claim 124) that defines e.g., whether the claim is recently submitted (e.g., submitted but no action has been taken yet), accepted (e.g., reviewed and awaiting processing), in process (e.g., currently being processed), approved (e.g., processed and approved for payment), paid (e.g., payment has been made) or rejected (e.g., processed and rejected).

A submission date for the vetted claim (e.g., vetted claim 124) that defines the date on which the vetted claim (e.g., vetted claim 124) was submitted to the claim service processor (e.g., claim service processor 116).

An age for the vetted claim (e.g., vetted claim 124) that defines the current age of the vetted claim (e.g., vetted claim 124), namely the current date minus the submission date.

An anticipated payment date for the vetted claim (e.g., vetted claim 124) that defines the date that the claim service processor (e.g., claim service processor 116) expects to make payment on the vetted claim (e.g., vetted claim 124).

A reimbursement value for the vetted claim (e.g., vetted claim 124) that defines the dollar value of the vetted claim (e.g., vetted claim 124).

Claim submission and monitoring process 10 may enable the user to format the status report (e.g., status report 170) to e.g., rank/color code the vetted claims (e.g., vetted claim 124) based upon the current status, rank/color code the vetted claims (e.g., vetted claim 124) based upon the submission date, rank/color code the vetted claims (e.g., vetted claim 124) based upon age, rank/color code the vetted claims (e.g., vetted claim 124) based upon the anticipated payment date, and rank/color code the vetted claims (e.g., vetted claim 124) based upon the reimbursement value.

Claim submission and monitoring process 10 may provide the status report (e.g., status report 170) to submitter (e.g., submitter 118).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable legal research processing apparatus, such that the instructions, which execute via the processor of the computer or other programmable legal research processing apparatus, create means for implementing the functions/acts specified in the flowchart and/or block diagram block or blocks.

These computer program instructions may also be stored in a computer-readable memory that may direct a computer or other programmable legal research processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable legal research processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   receiving an initial claim for a vehicle from a submitter, wherein the initial claim is destined for a claim service processor;
   processing the initial claim to determine if the initial claim can be processed by an existing bot included within a claim processing bot repository;
   determining that the initial claim cannot be processed by any of the existing bots included within the claim processing bot repository;
   in response to determining that the initial claim cannot be processed by any of the existing bots included within the claim processing bot repository, generating a bespoke bot for processing the initial claim, wherein generating a bespoke bot for processing the initial claim includes processing the initial claim for the vehicle from the submitter using machine learning/artificial intelligence to generate the bespoke bot for processing the initial claim;
   processing the bespoke bot to identify one or more additional vehicles for which claims are processable by the bespoke bot, thus defining a curated bot, wherein processing the bespoke bot to identify the one or more additional vehicles for which claims are processable by the bespoke bot includes identifying the one or more additional vehicles from a series of vehicles associated with a target vehicle of the initial claim;
   adding the curated bot to the claim processing bot repository; and
   processing the initial claim using the curated bot by automatically amending the initial claim to address the one or more specific rejections, thus defining an amended claim, wherein automatically amending the vetted claim to address the one or more specific rejections includes processing the one or more specific rejections defined within the rejected claim using machine learning/artificial intelligence of the curated bot to automatically amend the vetted claim to address the one or more specific rejections by:
      analyzing past submissions of claims to the claim service processor as input to the machine learning/artificial intelligence of the curated bot,
      generating one or more rejection patterns associated with the vetted claim using the machine learning/artificial intelligence of the curated bot, and
      correcting the one or more specific rejections using the one or more rejection patterns generated using the machine learning/artificial intelligence of the curated bot.

2. The computer-implemented method of claim 1 wherein the initial claim concerns one or more of:
   a covered maintenance claim for the vehicle;
   an over-the-counter parts claim for the vehicle;
   a transportation damage claim for the vehicle;
   a pre-delivery inspection claim for the vehicle;
   a warranty claim for the vehicle; and
   a recall for the vehicle.

3. The computer-implemented method of claim 1 wherein the submitter includes one or more of:
   an authorized service center associated with the vehicle;
   a dealership associated with the vehicle;
   a repair shop servicing the vehicle; and
   a company associated with the vehicle.

4. The computer-implemented method of claim 1 wherein the vehicle is one of:
   a private vehicle;
   a commercial vehicle;
   a watersport vehicle;
   a heavy equipment vehicle;
   an aircraft; and
   a fleet vehicle.

5. The computer-implemented method of claim 4 wherein the fleet vehicle includes one or more of:
   a corporate vehicle;
   a rideshare vehicle; and
   a rental vehicle.

6. The computer-implemented method of claim 1 wherein the claim service processor is an original equipment manufacturer of the vehicle.

7. The computer-implemented method of claim 1 wherein the claim service processor is a third-party warranty provider for the vehicle.

8. A computer program product residing on a non-transitory computer readable medium having a plurality of instructions stored thereon which, when executed by a processor, cause the processor to perform operations comprising:
   receiving an initial claim for a vehicle from a submitter, wherein the initial claim is destined for a claim service processor;
   processing the initial claim to determine if the initial claim can be processed by an existing bot included within a claim processing bot repository;
   determining that the initial claim cannot be processed by any of the existing bots included within the claim processing bot repository;
   in response to determining that the initial claim cannot be processed by any of the existing bots included within the claim processing bot repository, generating a bespoke bot for processing the initial claim, wherein generating a bespoke bot for processing the initial claim includes processing the initial claim for the vehicle from the submitter using machine learning/artificial intelligence to generate the bespoke bot for processing the initial claim;
   processing the bespoke bot to identify one or more additional vehicles for which claims are processable by the bespoke bot, thus defining a curated bot, wherein processing the bespoke bot to identify the one or more additional vehicles for which claims are processable by the bespoke bot includes identifying the one or more additional vehicles from a series of vehicles associated with a target vehicle of the initial claim;
   adding the curated bot to the claim processing bot repository; and
   processing the initial claim using the curated bot by automatically amending the initial claim to address the one or more specific rejections, thus defining an amended claim, wherein automatically amending the vetted claim to address the one or more specific rejections includes processing the one or more specific rejections defined within the rejected claim using machine learning/artificial intelligence of the curated bot to automatically amend the vetted claim to address the one or more specific rejections by:
      analyzing past submissions of claims to the claim service processor as input to the machine learning/artificial intelligence of the curated bot,
      generating one or more rejection patterns associated with the vetted claim using the machine learning/artificial intelligence of the curated bot, and correcting the one or more specific rejections using the one or more rejection patterns generated using the machine learning/artificial intelligence of the curated bot.

9. The computer program product of claim 8 wherein the initial claim concerns one or more of:
a covered maintenance claim for the vehicle;
an over-the-counter parts claim for the vehicle;
a transportation damage claim for the vehicle;
a pre-delivery inspection claim for the vehicle;
a warranty claim for the vehicle; and
a recall for the vehicle.

10. The computer program product of claim 8 wherein the submitter includes one or more of:
an authorized service center associated with the vehicle;
a dealership associated with the vehicle;
a repair shop servicing the vehicle; and
a company associated with the vehicle.

11. The computer program product of claim 8 wherein the vehicle is one of:
a private vehicle;
a commercial vehicle;
a watersport vehicle;
a heavy equipment vehicle;
an aircraft; and
a fleet vehicle.

12. The computer program product of claim 11 wherein the fleet vehicle includes one or more of:
a corporate vehicle;
a rideshare vehicle; and
a rental vehicle.

13. The computer program product of claim 8 wherein the claim service processor is an original equipment manufacturer of the vehicle.

14. The computer program product of claim 8 wherein the claim service processor is a third-party warranty provider for the vehicle.

15. A computing system including a processor and memory configured to perform operations comprising:
receiving, by the processor, an initial claim for a vehicle from a submitter, wherein the initial claim is destined for a claim service processor;
processing, by the processor, the initial claim to determine if the initial claim can be processed by an existing bot included within a claim processing bot repository;
determining, by the processor, that the initial claim cannot be processed by any of the existing bots included within the claim processing bot repository;
in response to determining that the initial claim cannot be processed by any of the existing bots included within the claim processing bot repository, generating, by the processor, a bespoke bot for processing the initial claim, wherein generating a bespoke bot for processing the initial claim includes processing the initial claim for the vehicle from the submitter using machine learning/artificial intelligence to generate the bespoke bot for processing the initial claim;
processing, by the processor, the bespoke bot to identify one or more additional vehicles for which claims are processable by the bespoke bot, thus defining a curated bot, wherein processing the bespoke bot to identify the one or more additional vehicles for which claims are processable by the bespoke bot includes identifying the one or more additional vehicles from a series of vehicles associated with a target vehicle of the initial claim;
adding, by the processor, the curated bot to the claim processing bot repository; and
processing the initial claim using the curated bot by automatically amending the initial claim to address the one or more specific rejections, thus defining an amended claim, wherein automatically amending the vetted claim to address the one or more specific rejections includes processing the one or more specific rejections defined within the rejected claim using machine learning/artificial intelligence of the curated bot to automatically amend the vetted claim to address the one or more specific rejections by:
analyzing past submissions of claims to the claim service processor as input to the machine learning/artificial intelligence of the curated bot,
generating one or more rejection patterns associated with the vetted claim using the machine learning/artificial intelligence of the curated bot, and
correcting the one or more specific rejections using the one or more rejection patterns generated using the machine learning/artificial intelligence of the curated bot.

16. The computing system of claim 15 wherein the initial claim concerns one or more of:
a covered maintenance claim for the vehicle;
an over-the-counter parts claim for the vehicle;
a transportation damage claim for the vehicle;
a pre-delivery inspection claim for the vehicle;
a warranty claim for the vehicle; and
a recall for the vehicle.

17. The computing system of claim 15 wherein the submitter includes one or more of:
an authorized service center associated with the vehicle;
a dealership associated with the vehicle;
a repair shop servicing the vehicle; and
a company associated with the vehicle.

18. The computing system of claim 15 wherein the vehicle is one of:
a private vehicle;
a commercial vehicle;
a watersport vehicle;
a heavy equipment vehicle;
an aircraft; and
a fleet vehicle.

19. The computing system of claim 18 wherein the fleet vehicle includes one or more of:
a corporate vehicle;
a rideshare vehicle; and
a rental vehicle.

20. The computing system of claim 15 wherein the claim service processor is an original equipment manufacturer of the vehicle.

21. The computing system of claim 15 wherein the claim service processor is a third-party warranty provider for the vehicle.

* * * * *